(12) United States Patent
Kawatoko et al.

(10) Patent No.: US 6,557,964 B2
(45) Date of Patent: May 6, 2003

(54) PRINTING APPARATUS AND METHOD

(75) Inventors: Norihiro Kawatoko, Kanagawa (JP); Hiroshi Tajika, Kanagawa (JP); Miyuki Fujita, Tokyo (JP); Yuji Konno, Kanagawa (JP); Takayuki Ogasahara, Kanagawa (JP); Tetsuya Edamura, Kanagawa (JP); Tetsuhiro Maeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/905,952

(22) Filed: Jul. 17, 2001

(65) Prior Publication Data

US 2002/0021319 A1 Feb. 21, 2002

(30) Foreign Application Priority Data

Jul. 17, 2000 (JP) ........................................ 2000-216694

(51) Int. Cl.⁷ ........................... B41J 2/205; G06K 15/10
(52) U.S. Cl. ........................................ 347/15; 358/3.01
(58) Field of Search ............................. 347/12, 15, 40, 347/41; 358/3.01, 3.06, 296; B41J 2/205

(56) References Cited

U.S. PATENT DOCUMENTS

| | | | |
|---|---|---|---|
| 3,604,846 A | * 9/1971 | Behane et al. | 358/470 |
| 3,977,007 A | * 8/1976 | Berry et al. | 347/15 |
| 4,313,124 A | 1/1982 | Hara | 347/57 |
| 4,345,262 A | 8/1982 | Shirato et al. | 347/10 |
| 4,374,388 A | * 2/1983 | Heinzl | 347/15 |
| 4,459,600 A | 7/1984 | Sato et al. | 347/47 |
| 4,463,359 A | 7/1984 | Ayata et al. | 347/56 |
| 4,558,333 A | 12/1985 | Sugitani et al. | 347/65 |
| 4,608,577 A | 8/1986 | Hori | 347/66 |
| 4,622,560 A | * 11/1986 | Withoos et al. | 347/12 |
| 4,723,129 A | 2/1988 | Endo et al. | 347/56 |
| 4,740,796 A | 4/1988 | Endo et al. | 347/56 |
| 6,193,358 B1 | 2/2001 | Fujita et al. | 347/41 |
| 6,203,133 B1 | 3/2001 | Hideki et al. | 347/15 |
| 6,302,508 B1 | * 10/2001 | Asauchi et al. | 347/15 |

FOREIGN PATENT DOCUMENTS

| | | | | |
|---|---|---|---|---|
| EP | 1 003 124 | * | 5/2000 | G06K/15/10 |
| EP | 1 079 327 | * | 2/2001 | G06K/15/10 |
| JP | 54-56847 | | 5/1979 | |
| JP | 59-123670 | | 7/1984 | |
| JP | 59-138461 | | 8/1984 | |
| JP | 60-71260 | | 4/1985 | |
| JP | 9-46522 | | 2/1997 | |

* cited by examiner

*Primary Examiner*—Judy Nguyen
*Assistant Examiner*—Blaise Mouttet
(74) *Attorney, Agent, or Firm*—Fitzpatrick, Cella, Harper & Scinto

(57) ABSTRACT

The present invention provides a printing apparatus and method that can prevent the image grade from lowering. A print head is provided with a plurality of printing elements to print dots on N adjacent rasters and dots on M adjacent columns under different conditions by causing the print heads perform a plurality of (P) main-scanning operations in a main-scanning direction and transporting a printing medium at least once in a sub-scanning direction. A plurality of dot arrangement patterns used for the same level of image data are periodically changed. The plurality of dot arrangement patterns are such that within each period when the patterns are repeatedly used, the number of dots formed in each of said N rasters are equalized, whereas the number of dots formed in each of said M columns are equalized.

17 Claims, 30 Drawing Sheets

(a) ODD RASTER, ODD COLUMN
(b) ODD RASTER, EVEN COLUMN
(c) EVEN RASTER, ODD COLUMN
(d) EVEN RASTER, EVEN COLUMN

FIG.24 (a) LEVEL 4 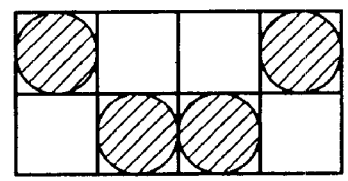
(b) LEVEL 4 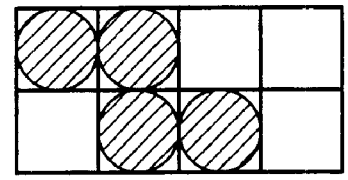

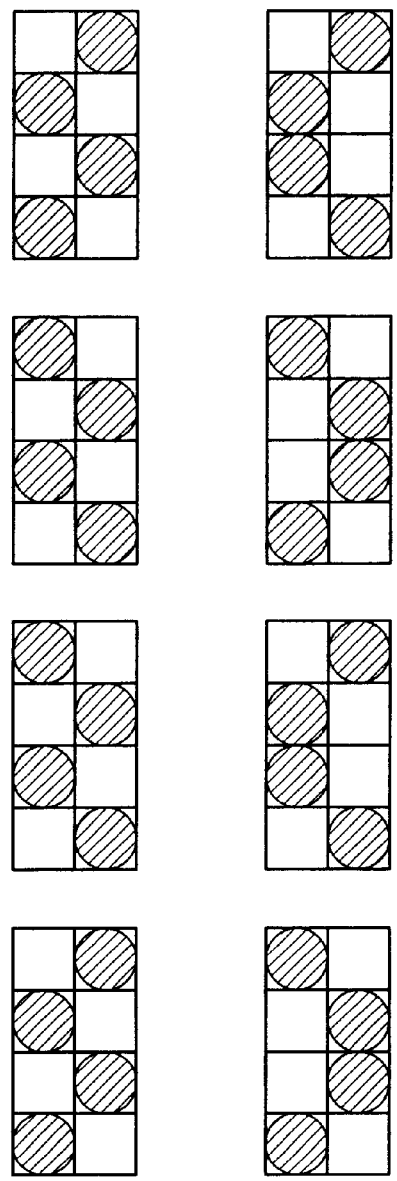
FIG. 25 (a) LEVEL 4 (b) LEVEL 4

FIG.26
(a) ODD RASTER, ODD COLUMN
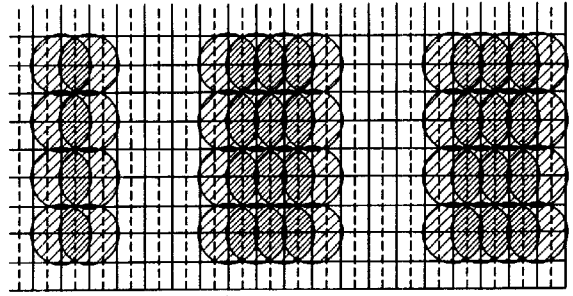
(b) ODD RASTER, EVEN COLUMN
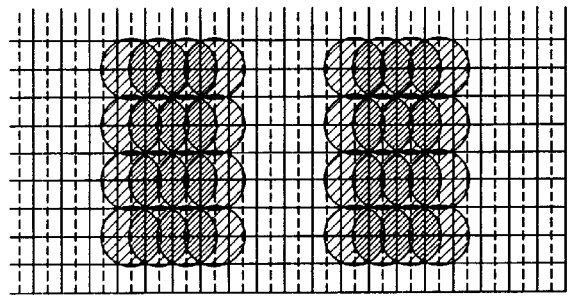
(c) EVEN RASTER, ODD COLUMN
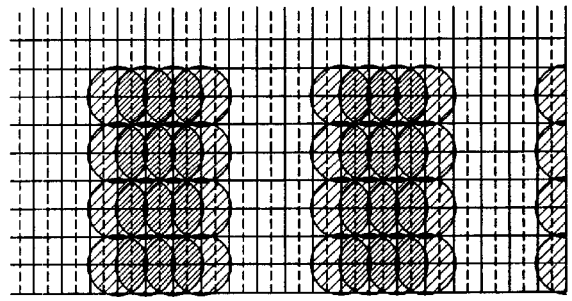
(d) EVEN RASTER, EVEN COLUMN
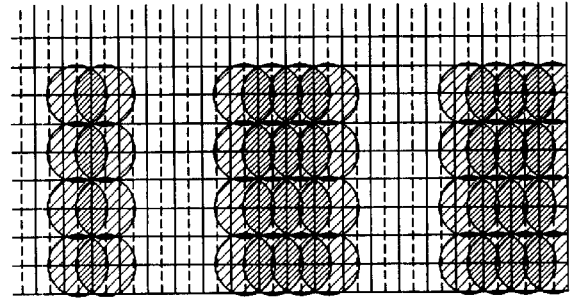

FIG.27
(a) ODD RASTER, ODD COLUMN
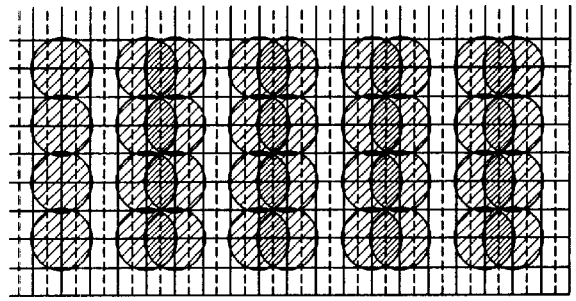
(b) ODD RASTER, EVEN COLUMN
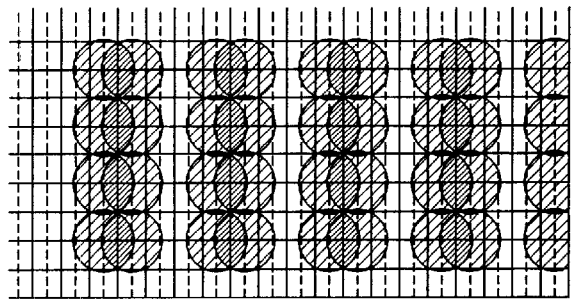
(c) EVEN RASTER, ODD COLUMN
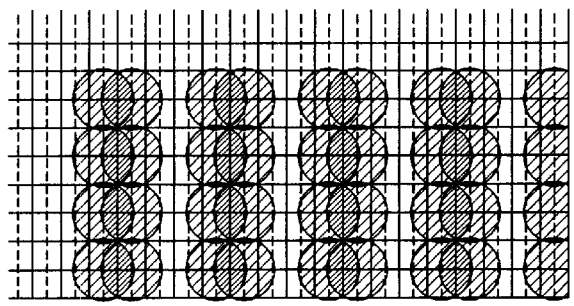
(d) EVEN RASTER, EVEN COLUMN
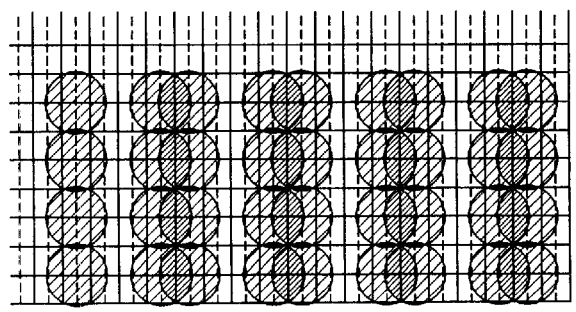

PRINTING APPARATUS AND METHOD

This application is based on Patent Application No. 2000-216694 filed Jul. 17, 2000 in Japan, the content of which is incorporated hereinto by reference.

BACKGROUND OF THE INVENTION

1. Field of the Invention

The present invention relates to a printing apparatus and method, and in particular, to a printing apparatus and method suitable for use in ink jet printing systems.

2. Description of the Related Art

Serial-scanning printing apparatuses that perform printing operations while scanning a print head on printing medium have been adapted to various image printing applications. In particular, ink jet printing apparatuses have been spreading rapidly due to their recently increased resolution and recently improved color printing function, which lead to an improved image grade. The serial-scanning printing apparatuses sequentially print images on printing medium by repeating a printing operation of printing an image on a printing medium while moving a print head in a main-scanning direction and a transporting operation of transporting the printing medium in a sub-scanning direction.

The serial-scanning ink jet printing apparatuses use, as a print head, a multi-nozzle head having a plurality of ejection ports integrated and arranged therein and constituting nozzles capable of ejecting ink droplets. Images can be printed with a higher resolution by increasing the integration density of the ejection ports and reducing the amount of ink ejected per dot. Further, for high-quality image printing equivalent to silver salt photographing, many techniques have been developed; for example, in addition to four basic color inks (cyan, magenta, yellow, and black), lighter-color inks of lower densities are provided, so that a total of six color inks (cyan, magenta, yellow, black, light cyan, and light magenta) are used for printing. Moreover, to avoid a decrease in printing speed associated with the increased image quality, techniques have been employed which increase the number of printing elements deployed in an arrangement including the ejection ports, increase the driving frequency for the print head, or enable bi-directional printing in which a printing operation is performed when the print head is scanned in either direction. As a result, the high throughput has been improved.

For these serial-scanning ink jet printing apparatuses, various proposals have been made for the construction of the print head and the printing method in order to deal with higher-resolution image printing.

FIGS. 11 to 13 are illustrations of an example of a construction of an ink jet print head H as a multi-nozzle head which includes nozzles arranged at a higher density to achieve high-density image printing. For the multi-nozzle head, a one-row nozzle arrangement in which ejection ports are arranged in a row has a limited nozzle arrangement density due to a manufacturing method used. Thus, in the print head H shown in FIG. 11, a plurality of ejection ports P capable of ejecting ink are formed so as to constitute two rows (hereafter also referred to as "nozzle rows") L1 and L2. The nozzle rows L1 and L2 extend in the sub-scanning direction shown by an arrow B in which printing medium is transported, and the ejection ports P are arranged at a predetermined pitch Py in each of the nozzle rows L1 and L2. An arrow X indicates a main-scanning direction in which the print head H reciprocates. The ejection ports P in the nozzle row L1 are offset from the ejection ports P in the nozzle row L2 by half a pitch (Py/2) in the sub-scanning direction. This serves to achieve a resolution twice as high as that achieved by single nozzle row. If, for example, six color inks are used to print image, six print heads H for ejecting the corresponding inks are provided in the sub-scanning direction. And, for each of the print heads H, timings for ejecting the ink from the ejection ports P in the nozzle rows L1 and L2 are adjusted. When image is thus printed using the one color ink from the two nozzle rows L1 and L2, color image of a double resolution can be printed compared to the one color ink from the one nozzle row.

On the other hand, the printing resolution of the printing apparatus does not always equal the resolution of image data input to the printing apparatus from a host apparatus (the latter resolution is hereafter referred to as an "input resolution"). The recent printing apparatuses can perform printing operations corresponding to a plurality of input resolutions. If, for example, the printing apparatus has a printing resolution of 1,200 dpi (dot/inch), the processing time and data transfer time of the host apparatus can be reduced when it processes image data at a resolution of 300 ppi (pixel/inch) and transfers it to the printing apparatus. If the host apparatus processes the image data at a resolution of 1,200 ppi correspondingly to the printing resolution of the printing apparatus, and transfers the data to the printing apparatus, then the host apparatus is overloaded. If the host apparatus processes the image data at a resolution of 300 ppi, one-fourth of 1,200 ppi, and transfers it to the printing apparatus, then the printing apparatus can print the image data in a printing area of 4×4 pixels while applying gradation thereto.

Such a printing method is described, for example, in Japanese Patent Application Laid-open No. 9-46522 (1997). FIG. 15 is an illustration of an example of that printing method. In the example in FIG. 15, the printing apparatus prints an image at a resolution of 600 dpi on the basis of image data of 300 ppi resolution transferred from the host apparatus. If the image data of 300 ppi input resolution is printed with the resolution unchanged, the printing resolution is 300 dpi. Thus, the example in FIG. 15 also corresponds to the case in which the printing apparatus prints an image at a resolution of 600 dpi on the basis of image data of 300 ppi resolution transferred from the host apparatus.

The printing apparatus uses an arrangement pattern (hereafter referred to as a "dot arrangement pattern") of dots D in a printing area of 2×2 pixels to achieve printing with five-value gradation from "level 0" to "level 4", as denoted by reference signs (a) to (e) in FIG. 15. A plurality of dot arrangement patterns are used for the "level 1", "level 2", and "level 3". Japanese Patent Application Laid-open No. 9-46522 (1997) describes the sequential and random use of such a plurality of dot arrangement patterns. As denoted by reference signs (b), (c), and (d) in FIG. 15, the arrangements of the dots D for expressing the "level 1", "level 2", and "level 3" gradations are not fixed. Thus, preventing the movement of the inks on a printing medium, for example, pseudo contours resulting from a pseudo half toning process or what is called "sweep-up phenomenon" occurring at edge portions of the image. Further, the frequency of the use of the print head nozzles can be leveled out.

Such a printing method is particularly effective on printing apparatuses of a high printing resolution. For high-quality image printing equivalent to photographing, the input resolution need not exceed a visually perceived range. As long as an input resolution of about 600 dpi is obtained, increasing the gradation of pixels is more effective than further increasing the input resolution. Moreover, smooth and less granular images can be printed by using the above described six color inks including the light color inks to improve the gradation.

Further, as the printing density increases with the resolution, the throughput may decrease. To prevent this, what is called a column thinning printing system or the like has been proposed in addition to the above described increase in the number of nozzles, increase in the driving frequency for the print heads, and proposal for bi-directional printing.

Next, the column thinning printing system will be described. Typically, in the serial-scanning ink jet printing apparatus, the speed at which a carriage with print heads mounted thereon moves in the main-scanning direction is determined by the frequency with which the inks are ejected depending on the driving frequency for the print heads and by a basic resolution. With the column thinning printing method, a printing operation is performed while moving the carriage at a speed higher than such a predetermined one. That is, the carriage is moved in the main-scanning direction, while a thinned image is printed on a printing medium by the print heads. Subsequently, the printing medium is transported a predetermined distance in the sub-scanning direction, and the carriage is then moved in the main-scanning direction, while a portion of the image which has not been printed yet is printed by the print heads. That is, the image to be printed is divided into a plurality of complementary portions, which are then printed during a plurality of scanning operations preformed by the print heads.

For example, in a 2-pass bi-directional column thinning printing method, the movement speed of the carriage is set twice the typical predetermined value, whereas the driving frequency for the print heads are set at a typical value. Then, as shown in FIG. 16, if it is assumed that a lattice corresponding to the basic printing resolution is set on the printing medium and if pixels to be printed at intersections of the lattice (hereafter referred to as "basic lattice points") are expressed as black and white circle portions, then the black circle portions are printed during the first scanning operation of the print head (first pass). Subsequently, the printing medium is transported in the sub-scanning direction a distance equal to half the length of the nozzle row of the print head, and the white circle portions in FIG. 16 are printed during the second scanning operation of the print head (second pass). In this example, the black circle portions in FIG. 16 are printed during forward scanning in which the print head move in the forward direction (forward printing), whereas the white circle portions in the same figure are printed during backward scanning in which the print head move in the backward direction (backward printing). Further, in this example, the movement speed of the carriage is doubled with the printing resolution remaining equal to the basic printing resolution. The printing resolution in the main-scanning direction, however, can be increased by reducing, for each main-scanning operation of the print head (for each pass), the intervals between the printing pixels in the main-scanning direction below the distance between the basic lattice points in FIG. 16 with the movement speed of the carriage remaining unchanged. Alternatively, both of these methods can be used to increase both the movement speeds of the carriage and the printing resolution.

If, however, the six color inks including the dark and light inks are used in order to improve the quality of printed image, the light inks serve to eliminate the granularity in low density areas of the image, whereas the granularity remains in gradation changing portions between an area printed by a light color ink and an area printed by a dark ink. This is because in a gradation area expressed by a light ink, a dark ink applied to that area is noticeable. Additionally, a sufficient image density may not be obtained even through the inks have been applied to all the printing lattice points.

Further, as described previously, with the print head H shown in FIG. 11, even and odd rasters alternatively arranged in the sub-scanning direction shown by an arrow Y are printed by the different nozzle rows L1 and L2. Thus, if points on the printing medium where ink droplets impact are slightly offset between the nozzle rows L1 and L2, the image grade may lower. The causes of the offset of the ink droplet impact points include errors in the formation of the ejection ports P during the manufacturing of the print head H and the thermal deformation of a head face of the print head H with the ejection ports formed therein. That is, when the head face is deformed due to the ink or the ambient temperature, each of the directions in which ink droplets I' are ejected from the ejection ports P in the nozzle rows L1 and L2 changes as shown by the alternate long and two short dashes line in FIG. 13. In this figure, the ejection directions of the ink droplets I' change so as to form an inverse V shape, that is, they shift rightward and leftward in the figure relative to the normal directions shown by the solid lines in the figure. On the other hand, contrary to FIG. 13, the ejection directions of the ink droplets I' may change so as to form a V shape relative to the normal ones shown by the solid lines in the figure.

In the print head H in FIG. 13, h denotes a heater (electrothermal converter) that generates thermal energy used as ejection energy for the ink droplets I' in response to a driving signal. The thermal energy from the heater h causes film boiling in ink I in the nozzle, and resultant bubbling energy causes the ink droplets I' to be ejected from the ejection ports P. Further, in the print head H, the ejection directions of the ink droplet I' may shift along the passage direction of the ink I due to an increase in the ejection force for the ink droplets I' which increase is associated with an increase in temperature, thereby changing the ejection direction as shown by the alternate long and two short dashes line in FIG. 13.

The image printing grade is adversely affected by the offset of the impact positions of the ink droplets which results from the above phenomena, that is, the offset of the impact positions of the ink droplets occurring between the odd raster for which dots are formed by one of the nozzle rows L1 or L2 and the even raster for which dots are formed by the other nozzle row L2 or L1, even if the degree of the offset is small. In particular, if a high-resolution image is printed on the basis of image data obtained by a binarization method such as an error diffusion method, the printed image is significantly degraded.

Further, many proposals have been made for methods of correcting, for each ink color, the offset of the impact positions of ink droplets ejected from the print head or correcting, in the case of the bi-directional printing, the offset of the impact points of the same color ink between the forward scanning and the backward scanning. No effective adjustment methods, however, have been proposed for the correction of the offset of the impact points of the same color ink between adjacent rasters which offset occurs if the print heads H as shown in FIGS. 11 to 13 are used, though the tolerable range of the offset is small and it severely degrades the printed image.

Moreover, the offset of the ejection directions of the ink droplets I' from the ejection ports P in the nozzle rows L1 and L2 as shown by the alternate long and two short dashes line in FIG. 13 is aggravated by individual differences among the print heads H occurring during manufacturing, as well as the compositions of the ink, histories such as the ejection frequency of the ink droplets I', or environments present during the printing operation. For example, in continuous printing operations, an increase in the temperature of the print head H may cause a decrease in the viscosity of the inks, an increase in ejection force, a change in ejection angle, and an increase in ejection speed, leading to the offset of the ejection directions of the ink droplets I'. The offset of the ejection directions varies with an increase in the temperature of the print head H during the printing operation, and returns to its original state after the printing operation has been completed, when the temperature of the print head H lowers. Thus, such changes in the situation cannot be dealt with even if the printing apparatus is provided with a mechanism for allowing a user to adjust the ejection directions.

Further, the above described technique described in Japanese Patent Application Laid-open No. 9-46522 (1997) is not intended to eliminate the offset of the impact positions of the ink droplets between the rasters and thus fails to solve this problem. Additionally, as described in this publication, the above described effect is expected to be obtained if the dot arrangement pattern is varied randomly. However, this requires a circuit for randomly generating a plurality of arrangement patterns, and this circuit must be relatively complicated. Moreover, if a plurality of arrangement patters are thus randomly generated, since a memory that supplies these plurality of arrangement patterns has a limited capacity, variations in arrangement pattern become significantly periodic, and this periodicity is expected to be noticeable on the printed image.

Further, if the column thinning printing method is employed in order to achieve printing while avoiding reducing the throughput as described previously, the impact positions of the ink droplets may be offset between the rasters due to the offset of the dot arrangements between complementary passes. Alternatively, with the bi-directional printing system, when a color image is printed using the color inks, the ink ejection order may vary with the scanning direction of the print heads. Consequently, in particular in high-density printed areas of the printing medium, coloring may vary with the order that the color ink dots are placed on one another, resulting in uneven colors, which degrade the image quality.

SUMMARY OF THE INVENTION

The present invention is provided in view of these circumstances, and it is an object thereof to provide a printing apparatus and method that can prevent the image grade from lowering by reducing the adverse effects of the variation of the positions of dots formed by a plurality of printing elements, in order to restrain the offset of dot forming positions between rasters.

In a first aspect of the present invention, there is provided a printing apparatus for printing with using a print head provided with a plurality of printing elements deployed in a plurality of rows and which can form dots on a printing medium, to print dots on N adjacent rasters and dots on M adjacent columns under different conditions by causing the print heads to perform a plurality of (P) main-scanning operations in a main-scanning direction and transporting the printing medium at least once in a sub-scanning direction, the apparatus comprising:

control means for using dot arrangement patterns corresponding to a level of quantized image data to form dots corresponding to the level of the image data on the printed medium, the control means being capable of periodically changing the plurality of dot arrangement patterns used for the same level of the image data, wherein the plurality of dot arrangement patterns used for the same level of the image data are such that within each period when the patterns are periodically used, the number of dots formed in each of the N rasters are equalized, whereas the number of dots formed in each of the M columns are equalized, and the P, N, and M are each an integral equal to or larger than 2.

In a second aspect of the present invention, there is provided a printing apparatus for printing with using a print head provided with a plurality of printing elements deployed in a plurality of rows and which can form dots on a printing medium, to print dots on N adjacent rasters and dots on M adjacent columns under different conditions by causing the print heads to perform a plurality of (P) main-scanning operations in a main-scanning direction and transporting the printing medium at least once in a sub-scanning direction, the apparatus comprising:

control means for using dot arrangement patterns corresponding to a level of quantized image data to form dots corresponding to the level of the image data on the printed medium, the control means can set one of the dot arrangement pattern which is used for the same level of the image data, the one of the dot arrangement pattern which is used for the same level of the image data is such that an area of a surface on which dots are formed in each combination of the 1 to N rasters and the 1 to M columns using the dot arrangement pattern occupies 90% or more of a printing surface of the printing medium which corresponds to a printing range for the dot arrangement pattern, and the P, N, and M are each an integral equal to or larger than 2.

In a third aspect of the present invention, there is provided a printing method for printing with using a print head provided with a plurality of printing elements deployed in a plurality of rows and which can form dots on a printing medium, to print dots on N adjacent rasters and dots on M adjacent columns under different conditions by causing the print heads to perform a plurality of (P) main-scanning operations in a main-scanning direction and transporting the printing medium at least once in a sub-scanning direction, comprising the steps of:

using dot arrangement patterns corresponding to a level of quantized image data to form dots corresponding to the level of the image data on the printing medium; and periodically changing the plurality of dot arrangement patterns used for the same level of the image data, wherein the plurality of dot arrangement patterns used for the same level of the image data are such that within each period when the patterns are periodically used, the number of dots formed in each of the N rasters are equalized, whereas the number of dots formed in each of the M columns are equalized, and the P, N, and M are each an integral equal to or larger than 2.

In a fourth aspect of the present invention, there is provided a printing method for printing with using a print head provided with a plurality of printing elements deployed in a plurality of rows and which can form dots on a printing medium, to print dots on N adjacent rasters and dots on M adjacent columns under different conditions by causing the print heads to perform a plurality of (P) main-scanning operations in a main-scanning direction and transporting the printing medium at least once in a sub-scanning direction, comprising the steps of:

using dot arrangement patterns corresponding to a level of quantized image data to form dots corresponding to the level of the image data on the printed medium; and setting one of the dot arrangement patterns which is used for the same level of the image data, wherein the one of the dot arrangement pattern which is used for the same level of the image data is such that an area of a surface on which dots are formed in each combination of the 1 to N rasters and the 1 to M columns using the dot arrangement pattern occupies 90% or more of a printing surface of the printing medium which corresponds to a printing range for the dot arrangement pattern, and the P, N, and M are each an integral equal to or larger than 2.

The present invention adopts printing style using a print head provided with a plurality of printing elements positioned in a plurality of rows to print dots on N adjacent rasters and dots on M adjacent columns under different conditions by causing the print head perform a plurality of (P) main-scanning operations in a main-scanning direction and transporting a printing medium at least once in a sub-scanning direction, wherein a plurality of dot arrangement patterns used for the same level of image data are periodically changed and are such that within each period when the patterns are repeatedly used, the number of dots formed in each of the N rasters are equated, and the number of dots formed in each of the M columns are equated. Thus, the adverse effects of the dispersion of dot forming positions among a plurality of printing elements are reduced to restrain the offset of the dot forming positions between the rasters, thereby preventing the image grade from lowering.

The present invention also adopts printing style using a print head provided with a plurality of printing elements positioned in a plurality of rows to print dots on N adjacent rasters and dots on M adjacent columns under different conditions by causing the print head perform a plurality of (P) main-scanning operations in a main-scanning direction and transporting a printing medium at least once in a sub-scanning direction, wherein one dot arrangement pattern is set which is used for the same level of image data and is such that a surface on which dots are formed in each combination of one of the 1 to N rasters and one of the 1 to M columns using that dot arrangement pattern occupies 90% or more of a printed surface of a printing medium which corresponds to a printing range for the dot arrangement pattern. Thus, the adverse effects of the dispersion of dot forming positions among a plurality of printing elements are reduced to restrain the offset of the dot forming positions between the rasters, thereby preventing the image grade from lowering.

BRIEF DESCRIPTION OF THE DRAWINGS

FIG. 24 is an explanatory illustration of different examples of dot arrangement patterns at the "level 4" denoted by reference sign (e) in FIG. 21(e);

FIG. 25 is an explanatory illustration of referential examples of dot arrangement patterns at the "level 4";

FIG. 26 is an explanatory illustration of the positional offset of dots observed if the dot arrangement pattern (a) denoted by reference sign in FIG. 25 is used;

FIG. 27 is an explanatory illustration of the positional offset of dots observed if the dot arrangement pattern (b) denoted by reference sign in FIG. 25 is used.

DESCRIPTION OF THE PREFERRED EMBODIMENTS

Embodiments of the printing apparatus according to the present invention will be described by referring, to the accompanying drawings.

In the following description we take up as an example a printing apparatus using an ink jet printing system.

In this specification, a word "print" (or "record") refers to not only forming significant information, such as characters and figures, but also forming images, designs or patterns on printing medium and processing media, whether the information is significant or insignificant or whether it is visible so as to be perceived by humans.

The word "print medium" or "print sheet" include not only paper used in common printing apparatus, but cloth, plastic films, metal plates, glass, ceramics, wood, leather or any other material that can receive ink. This word will be also referred to "paper".

Further, the word "ink" (or "liquid") should be interpreted in its wide sense as with the word "print" and refers to liquid that is applied to the printing medium to form images, designs or patterns, process the printing medium or process ink (for example, coagulate or make insoluble a colorant in the ink applied to the printing medium).

1. Apparatus Body

Figure 1:
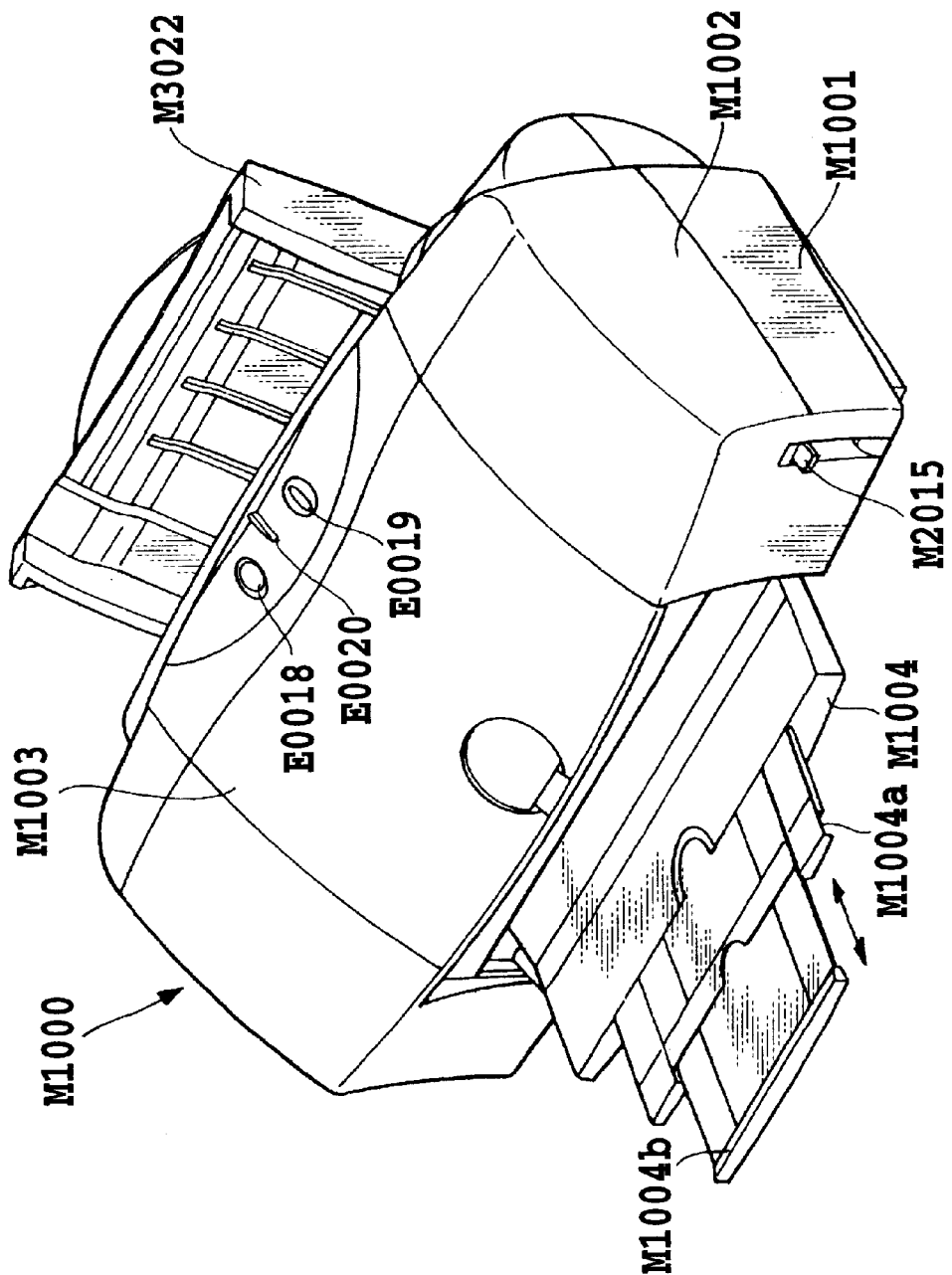
FIG. 1 is a perspective view showing an external construction of an ink jet printer as one embodiment of the present invention.
Figure 2:
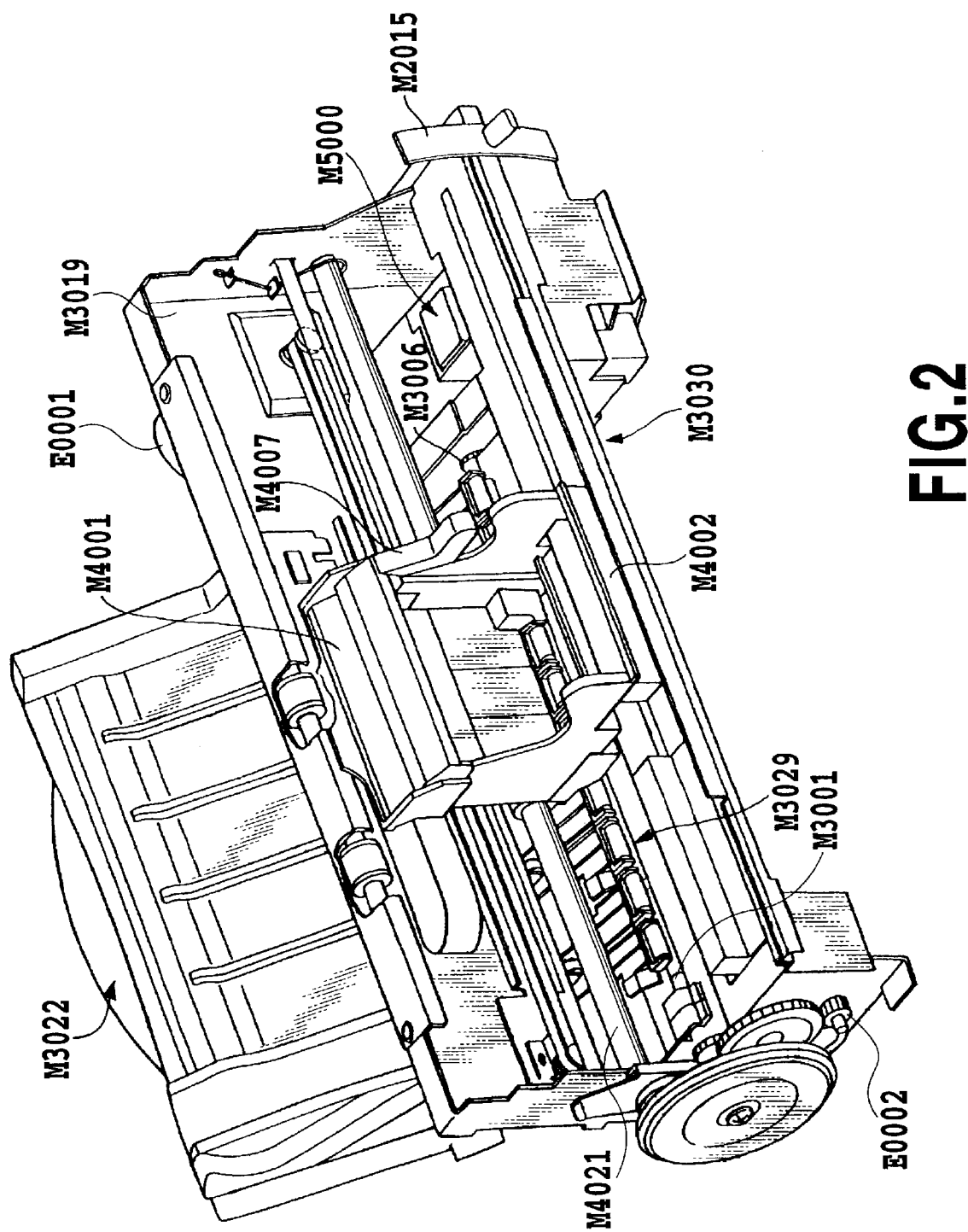
FIG. 2 is a perspective view showing the printer of FIG. 1 with an enclosure member removed.

FIGS. 1 and 2 show an outline construction of a printer using an ink jet printing system. In FIG. 1, a housing of a printer body M1000 of this embodiment has an enclosure member, including a lower case M1001, an upper case M1002, an access cover M1003 and a discharge tray M1004, and a chassis M3019 (see FIG. 2) accommodated in the enclosure member.

The chassis M3019 is made of a plurality of plate-like metal members with a predetermined rigidity to form a skeleton of the printing apparatus and holds various printing operation mechanisms described later.

The lower case M1001 forms roughly a lower half of the housing of the printer body M1000 and the upper case M1002 forms roughly an upper half of the printer body M1000. These upper and lower cases, when combined, form a hollow structure having an accommodation space therein to accommodate various mechanisms described later. The printer body M1000 has an opening in its top portion and front portion.

The discharge tray M1004 has one end portion thereof rotatably supported on the lower case M1001. The discharge tray M1004, when rotated, opens or closes an opening formed in the front portion of the lower case M1001. When the print operation is to be performed, the discharge tray M1004 is rotated forwardly to open the opening so that printed sheets can be discharged and successively stacked. The discharge tray M1004 accommodates two auxiliary trays M1004a, M1004b. These auxiliary trays can be drawn out forwardly as required to expand or reduce the paper support area in three steps.

The access cover M1003 has one end portion thereof rotatably supported on the upper case M1002 and opens or closes an opening formed in the upper surface of the upper case M1002. By opening the access cover M1003, a print head cartridge H1000 or an ink tank H1900 installed in the body can be replaced. When the access cover M1003 is opened or closed, a projection formed at the back of the access cover, not shown here, pivots a cover open/close lever. Detecting the pivotal position of the lever as by a micro-switch and so on can determine whether the access cover is open or closed.

At the upper rear surface of the upper case M1002 a power key E0018, a resume key E0019 and an LED E0020 are provided. When the power key E0018 is pressed, the LED E0020 lights up indicating to an operator that the apparatus is ready to print. The LED E0020 has a variety of display functions, such as alerting the operator to printer troubles as by changing its blinking intervals and color. Further, a buzzer E0021 (FIG. 7) may be sounded. When the trouble is eliminated, the resume key E0019 is pressed to resume the printing.

2. Printing Operation Mechanism

Next, a printing operation mechanism installed and held in the printer body M1000 according to this embodiment will be explained.

The printing operation mechanism in this embodiment comprises: an automatic sheet feed unit M3022 to automatically feed a print sheet into the printer body; a sheet transport unit M3029 to guide the print sheets, fed one at a time from the automatic sheet feed unit, to a predetermined print position and to guide the print sheet from the print position to a discharge unit M3030; a print unit to perform a desired printing on the print sheet carried to the print position; and an ejection performance recovery unit M5000 to recover the ink ejection performance of the print unit.

Here, the print unit will be described. The print unit comprises a carriage M4001 movably supported on a carriage shaft M4021 and a print head cartridge H1000 removably mounted on the carriage M4001.

2.1 Print Head Cartridge

First, the print head cartridge used in the print unit will be described with reference to FIGS. 3 to 5.

Figure 3:
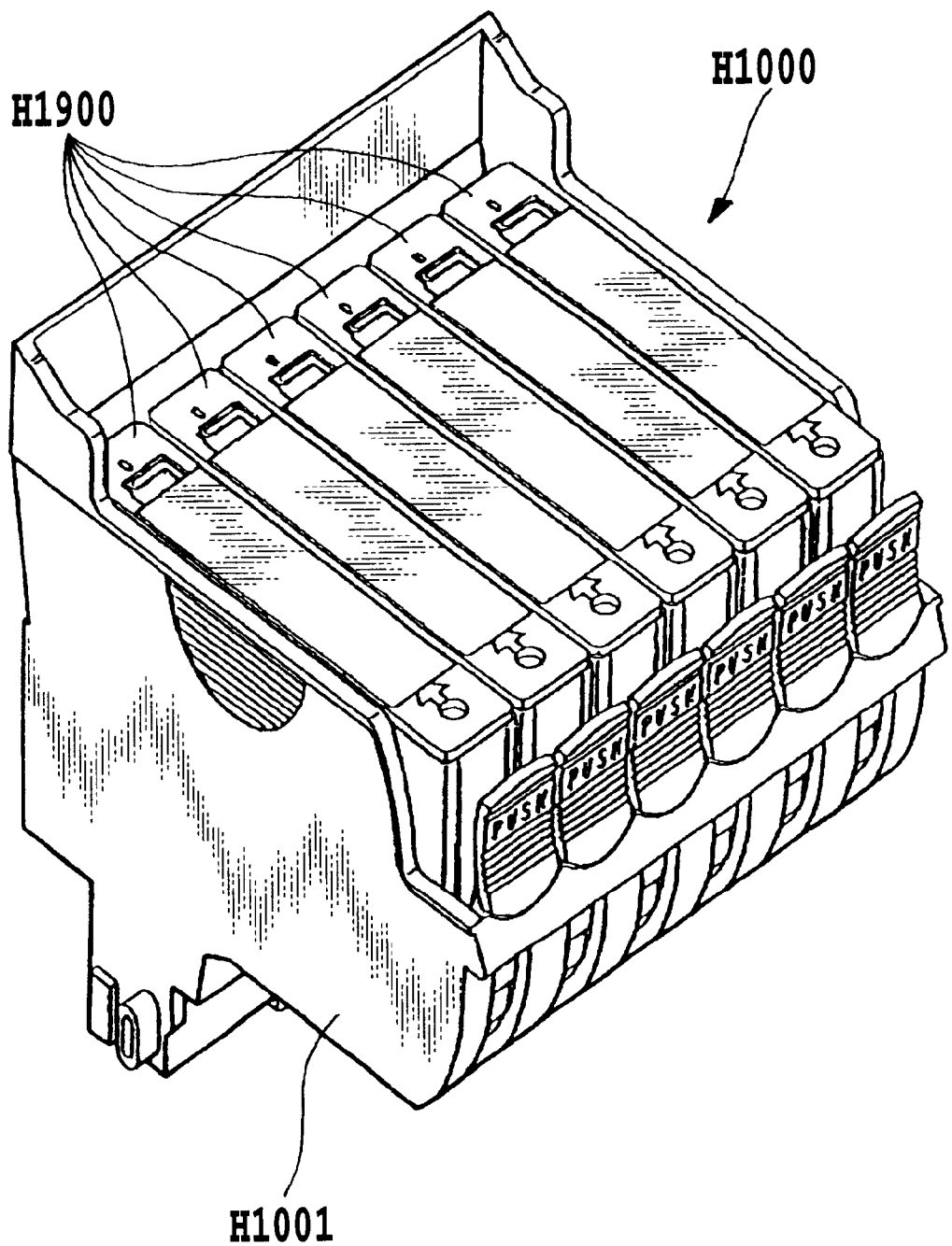
FIG. 3 is a perspective view showing an assembled print head cartridge used in the printer of one embodiment of the present invention.
Figure 4:
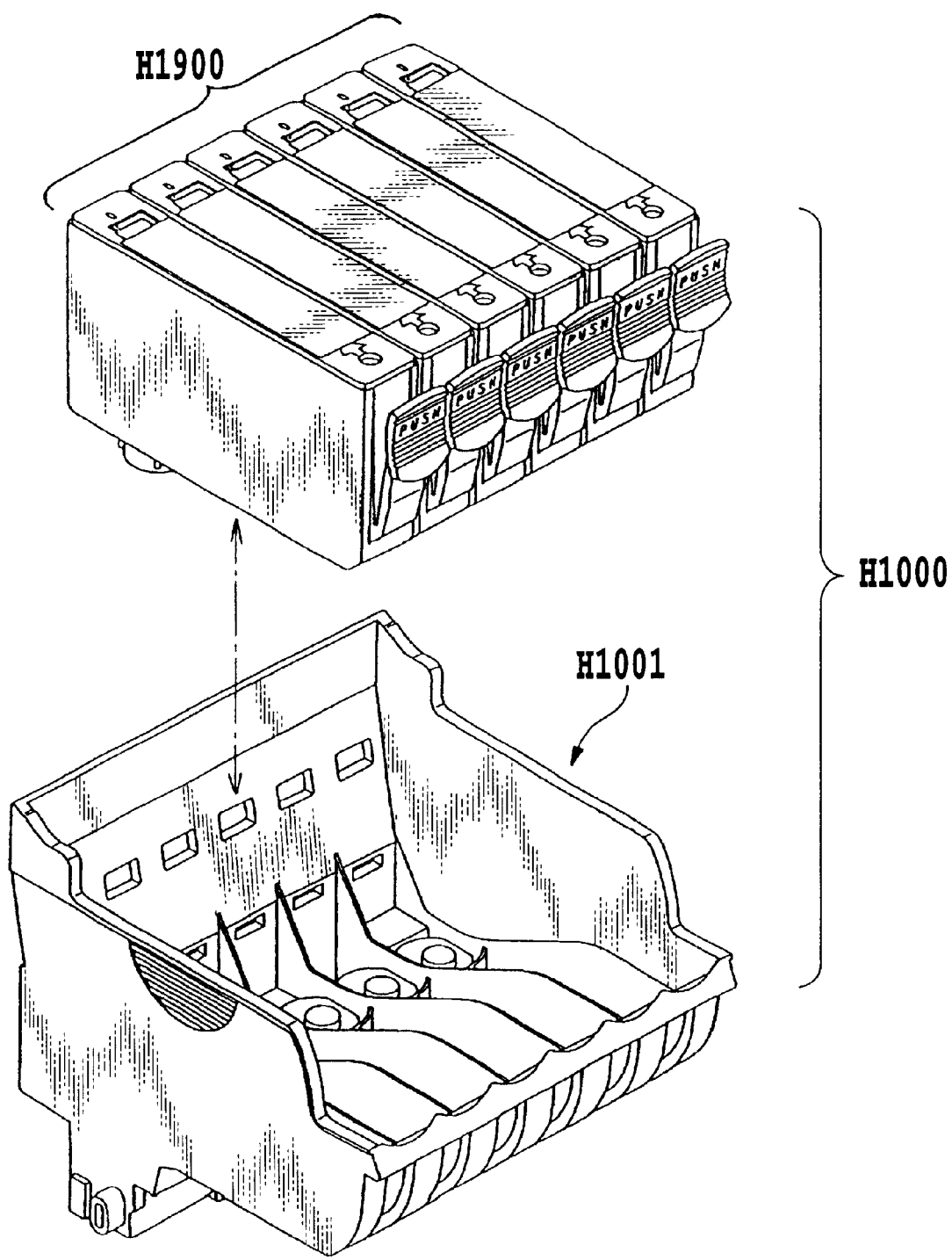
FIG. 4 is an exploded perspective view showing the print head cartridge of FIG. 3.

The print head cartridge H1000 in this embodiment, as shown in FIG. 3, has an ink tank H1900 containing inks and a print head H1001 for ejecting ink supplied from the ink tank H1900 out through nozzles according to print information. The print head H1001 is of a so-called cartridge type in which it is removably mounted to the carriage M4001 described later.

The ink tank for this print head cartridge H1000 consists of separate ink tanks H1900 of, for example, black, light cyan, light magenta, cyan, magenta and yellow to enable color printing with as high an image quality as photograph. As shown in FIG. 4, these individual ink tanks are removably mounted to the print head H1001.

Figure 5:
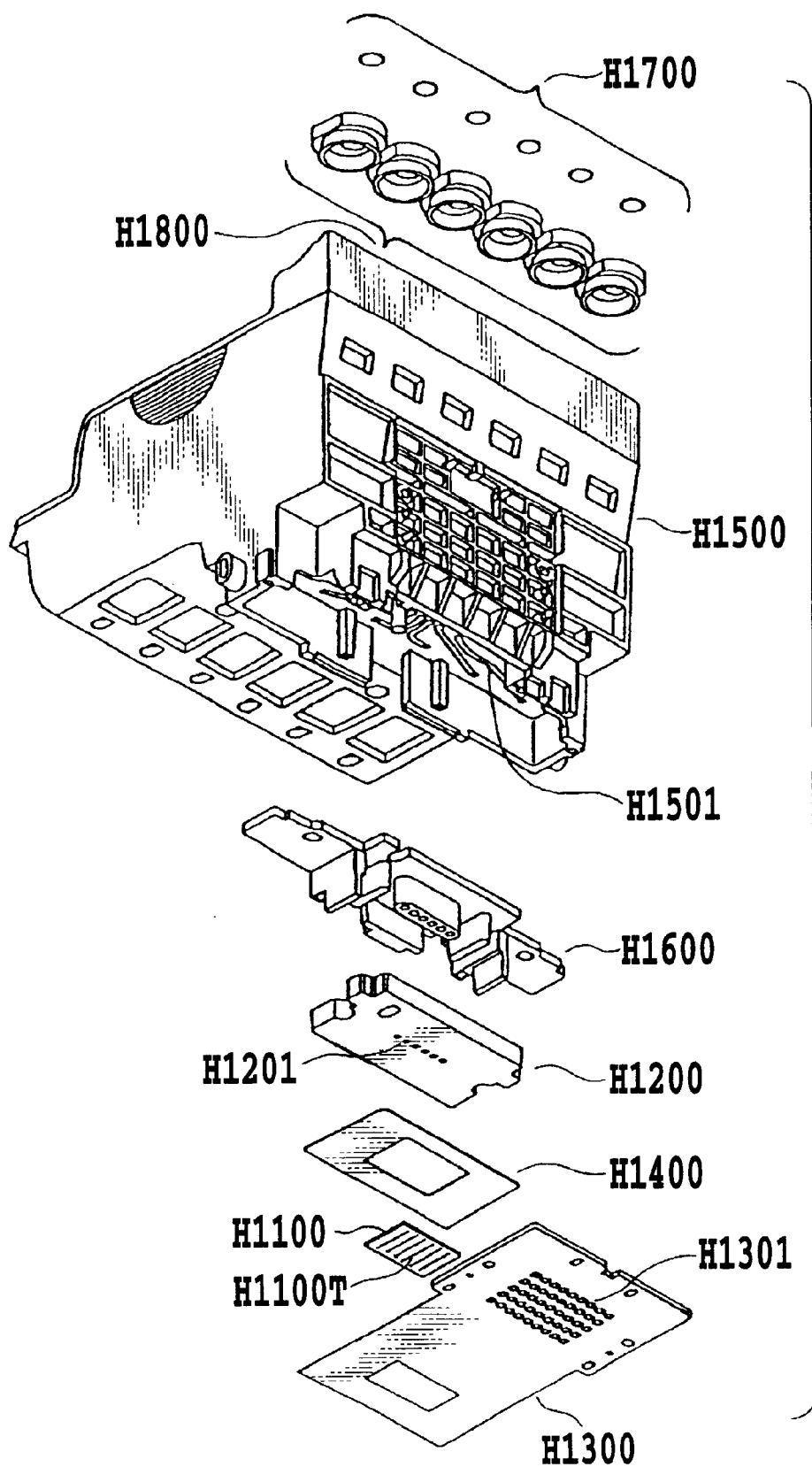
FIG. 5 is an exploded perspective view of the print head of FIG. 4 as seen diagonally below.

Then, the print head H1001, as shown in the perspective view of FIG. 5, comprises a print element substrate H1100, a first plate H1200, an electric wiring board H1300, a second plate H1400, a tank holder H1500, a flow passage forming member H1600, a filter H1700 and a seal rubber H1800.

The print element silicon substrate H1100 has formed in one of its surfaces, by the film deposition technology, a plurality of print elements to produce energy for ejecting ink and electric wires, such as aluminum, for supplying electricity to individual print elements. A plurality of ink passages and a plurality of nozzles H1100T, both corresponding to the print elements, are also formed by the photolithography technology. In the back of the print element substrate H110, there are formed ink supply ports for supplying ink to the plurality of ink passages. The print element substrate H1100 is securely bonded to the first plate H1200 which is formed with ink supply ports H1201 for supplying ink to the print element substrate H110. The first plate H1200 is securely bonded with the second plate H1400 having an opening. The second plate H1400 holds the electric wiring board H1300 to electrically connect the electric wiring board H1300 with the print element substrate H1100. The electric wiring board H1300 is to apply electric signals for ejecting ink to the print element substrate H1100, and has electric wires associated with the print element substrate H1100 and external signal input terminals H1301 situated at electric wires' ends for receiving electric signals from the printer body. The external signal input terminals H1301 are positioned and fixed at the back of a tank holder H1500 described later.

The tank holder H1500 that removably holds the ink tank H1900 is securely attached, as by ultrasonic fusing, with the flow passage forming member H1600 to form an ink passage H1501 from the ink tank H1900 to the first plate H1200. At the ink tank side end of the ink passage H1501 that engages with the ink tank H1900, a filter H1700 is provided to prevent external dust from entering. A seal rubber H1800 is provided at a portion where the filter H1700 engages the ink tank H1900, to prevent evaporation of the ink from the engagement portion.

As described above, the tank holder unit, which includes the tank holder H1500, the flow passage forming member H1600, the filter H1700 and the seal rubber H1800, and the print element unit, which includes the print element substrate H1100, the first plate H1200, the electric wiring board H1300 and the second plate H1400, are combined as by adhesives to form the print head H1001.

2.2 Carriage

Next, by referring to FIG. 2, the carriage M4001 carrying the print head cartridge H1000 will be explained.

As shown in FIG. 2, the carriage M4001 has a carriage cover M4002 for guiding the print head H1001 to a predetermined mounting position on the carriage M4001, and a head set lever M4007 that engages and presses against the tank holder H1500 of the print head H1001 to set the print head H1001 at a predetermined mounting position.

That is, the head set lever M4007 is provided at the upper part of the carriage M4001 so as to be pivotable about a head set lever shaft. There is a spring-loaded head set plate (not shown) at an engagement portion where the carriage M4001 engages the print-head H1001. With the spring force, the head set lever M4007 presses against the print head H1001 to mount it on the carriage M4001.

At another engagement portion of the carriage M4001 with the print head H1001, there is provided a contact flexible printed cable (see FIG. 7: simply referred to as a contact FPC hereinafter) E0011 whose contact portion electrically contacts a contact portion (external signal input terminals) H1301 provided in the print head H1001 to transfer various information for printing and supply electricity to the print head H1001.

Between the contract portion of the contact FPC E0011 and the carriage M4001 there is an elastic member not shown, such as rubber. The elastic force of the elastic member and the pressing force of the head set lever spring combine to ensure a reliable contact between the contact portion of the contact FPC E0011 and the carriage M4001. Further, the contact FPC E0011 is connected to a carriage substrate E0013 mounted at the back of the carriage M4001 (see FIG. 7).

3. Scanner

The printer of this embodiment can mount a scanner in the carriage M4001 in place of the print head cartridge H1000 and be used as a reading device.

The scanner moves together with the carriage M4001 in the main scan direction, and reads an image on a document fed instead of the printing medium as the scanner moves in the main scan direction. Alternating the scanner reading operation in the main scan direction and the document feed in the sub-scan direction enables one page of document image information to be read.

Figure 6A:
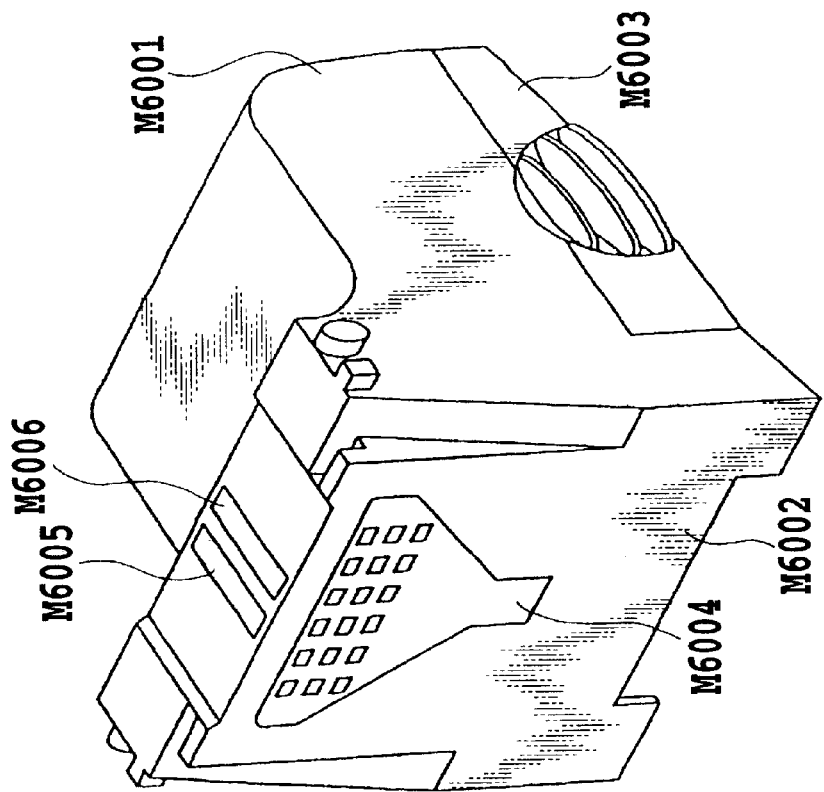
FIGS. 6A and 6B are perspective views showing a construction of a scanner cartridge upside down which can be mounted in the printer of one embodiment of the present invention instead of the print head cartridge of FIG. 3.
Figure 6B:
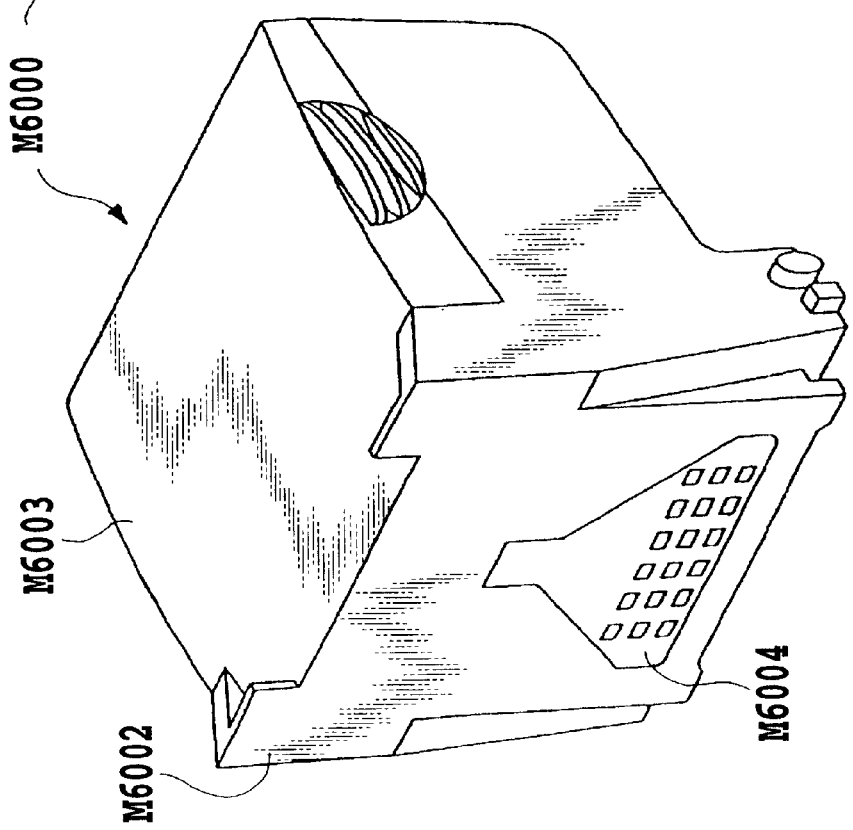

FIGS. 6A and 6B show the scanner M6000 upside down to explain about its outline construction.

As shown in the figure, a scanner holder M6001 is shaped like a box and contains an optical system and a processing circuit necessary for reading. A reading lens M6006 is provided at a portion that faces the surface of a document when the scanner M6000 is mounted on the carriage M4001. The lens M6006 focuses light reflected from the document surface onto a reading unit inside the scanner to read the document image. An illumination lens M6005 has a light source not shown inside the scanner. The light emitted from the light source is radiated onto the document through the lens M6005.

The scanner cover M6003 secured to the bottom of the scanner holder M6001 shields the interior of the scanner holder M6001 from light. Louver-like grip portions are provided at the sides to improve the ease with which the scanner can be mounted to and dismounted from the carriage M4001. The external shape of the scanner holder M6001 is almost similar to that of the print head H1001, and the scanner can be mounted to or dismounted from the carriage M4001 in a manner similar to that of the print head H1001.

The scanner holder M6001 accommodates a substrate having a reading circuit, and a scanner contact PCB M6004 connected to this substrate is exposed outside. When the scanner M6000 is mounted on the carriage M4001, the scanner contact PCB M6004 contacts the contact FPC E0011 of the carriage M4001 to electrically connect the substrate to a control system on the printer body side through the carriage M4001.

4. Example Configuration of Printer Electric Circuit

Next, an electric circuit configuration in this embodiment of the invention will be explained.

Figure 7:
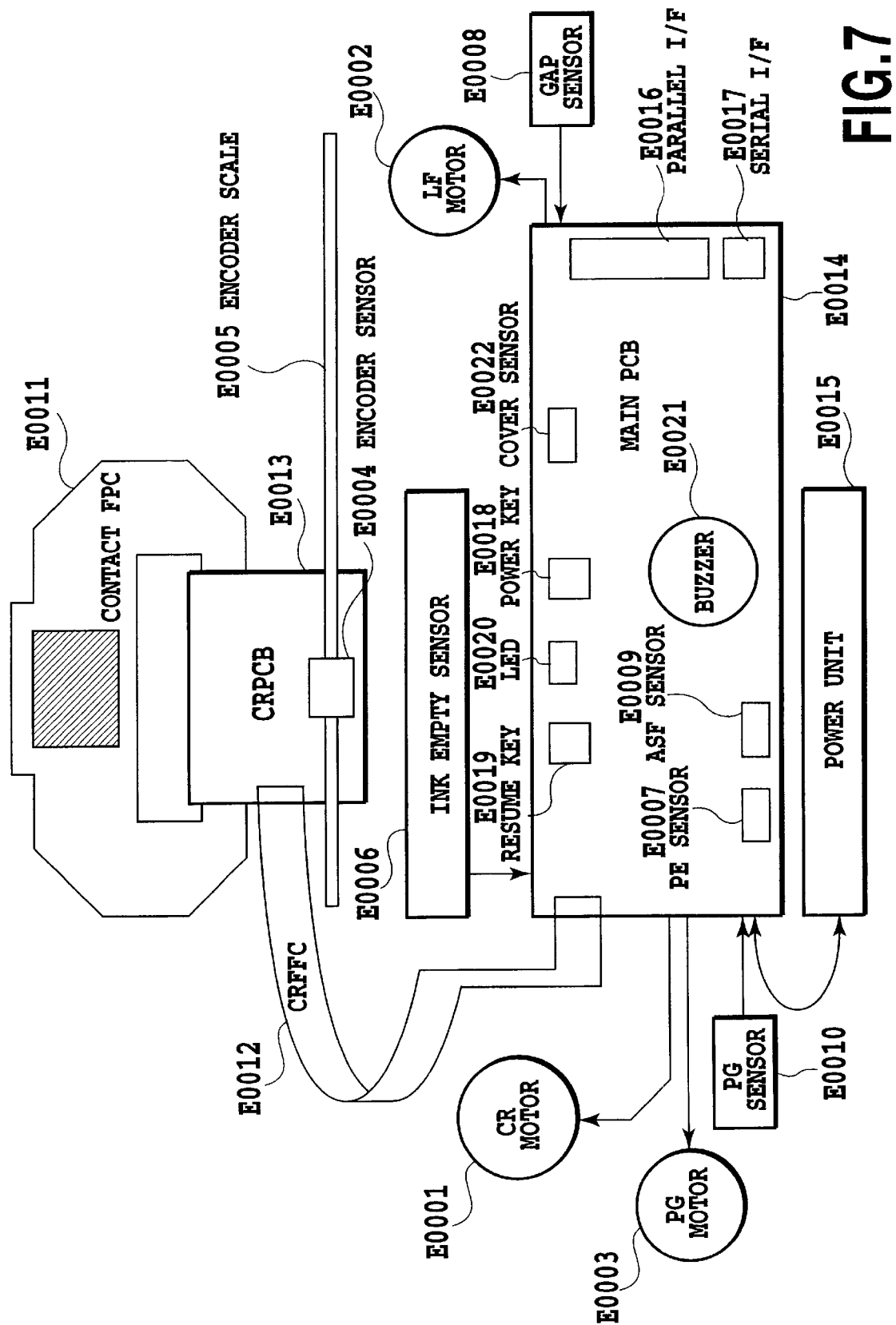
FIG. 7 is a block diagram schematically showing the overall configuration of an electric circuitry of the printer according to one embodiment of the present invention.

FIG. 7 schematically shows the overall configuration of the electric circuit in this embodiment.

The electric circuit in this embodiment comprises mainly a carriage substrate (CRPCB) E0013, a main PCB (printed circuit board) E0014 and a power supply unit E0015.

The power supply unit E0015 is connected to the main PCB E0014 to supply a variety of drive power.

The carriage substrate E0013 is a printed circuit board unit mounted on the carriage M4001 (FIG. 2) and functions as an interface for transferring signals to and from the print head through the contact FPC E0011. In addition, based on a pulse signal output from an encoder sensor E0004 as the carriage M4001 moves, the carriage substrate E0013 detects a change in the positional relation between an encoder scale E0005 and the encoder sensor E0004 and sends its output signal to the main PCB E0014 through a flexible flat cable (CRFFC) E0012.

Further, the main PCB E0014 is a printed circuit board unit that controls the operation of various parts of the ink jet printing apparatus in this embodiment, and has I/O ports for a paper end sensor (PE sensor) E0007, an automatic sheet feeder (ASF) sensor E0009, a cover sensor E0022, a parallel interface (parallel I/F) E0016, a serial interface (Serial I/F)

E0017, a resume key E0019, an LED E0020, a power key E0018 and a buzzer E0021. The main PCB E0014 is connected to and controls a motor (CR motor) E0001 that constitutes a drive source for moving the carriage M4001 in the main scan direction; a motor (LF motor) E0002 that constitutes a drive source for transporting the printing medium; and a motor (PG motor) E0003 that performs the functions of recovering the ejection performance of the print head and feeding the printing medium. The main PCB E0014 also has connection interfaces with an ink empty sensor E0006, a gap sensor E0008, a PG sensor E0010, the CRFFC E0012 and the power supply unit E0015.

Figure 8A:
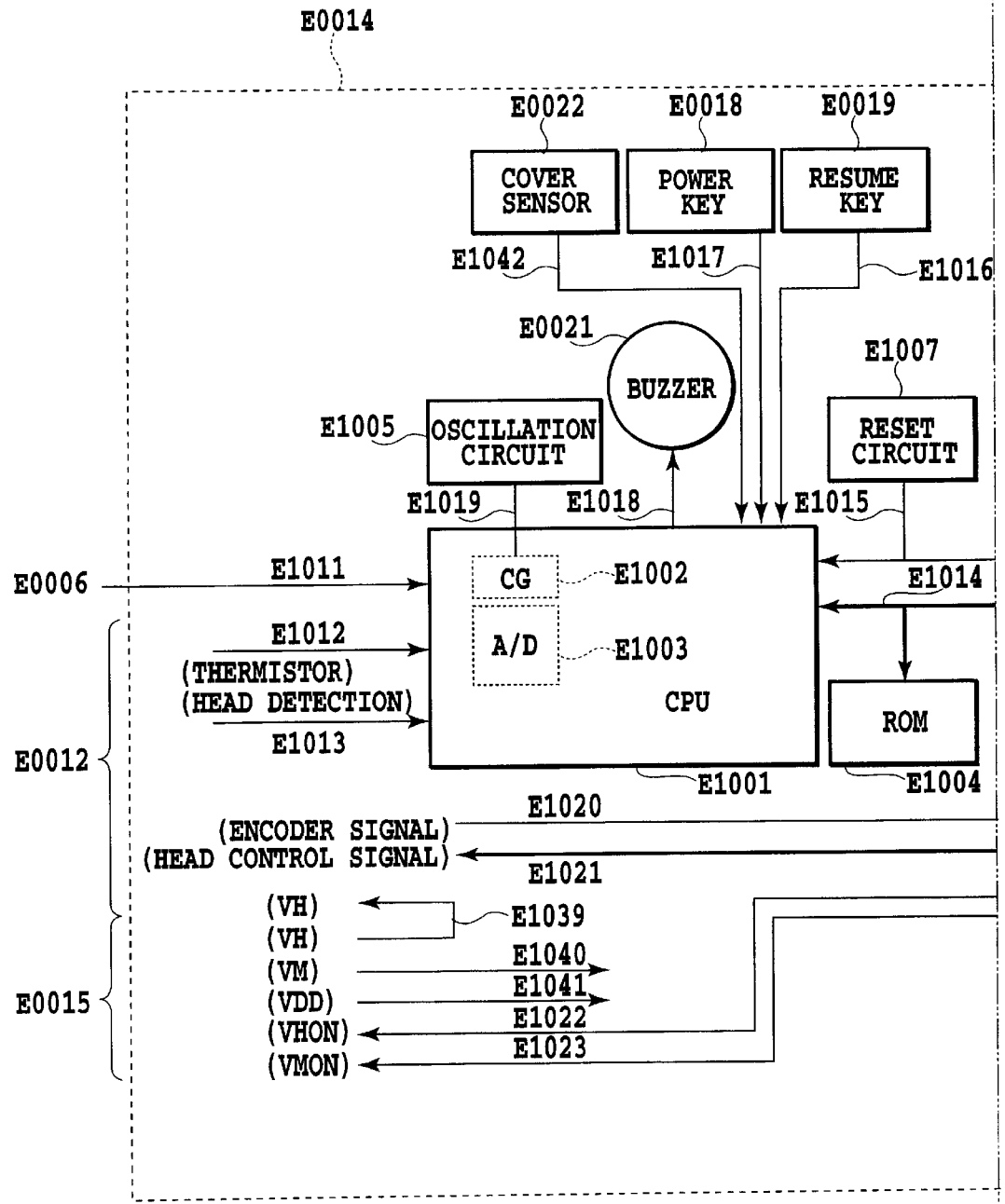
FIG. 8 is a diagram showing the relation between FIGS. 8A and 8B, FIGS. 8A and 8B being block diagrams representing an example inner configuration of a main printed circuit board (PCB) in the electric circuitry of FIG. 7.
Figure 8B:
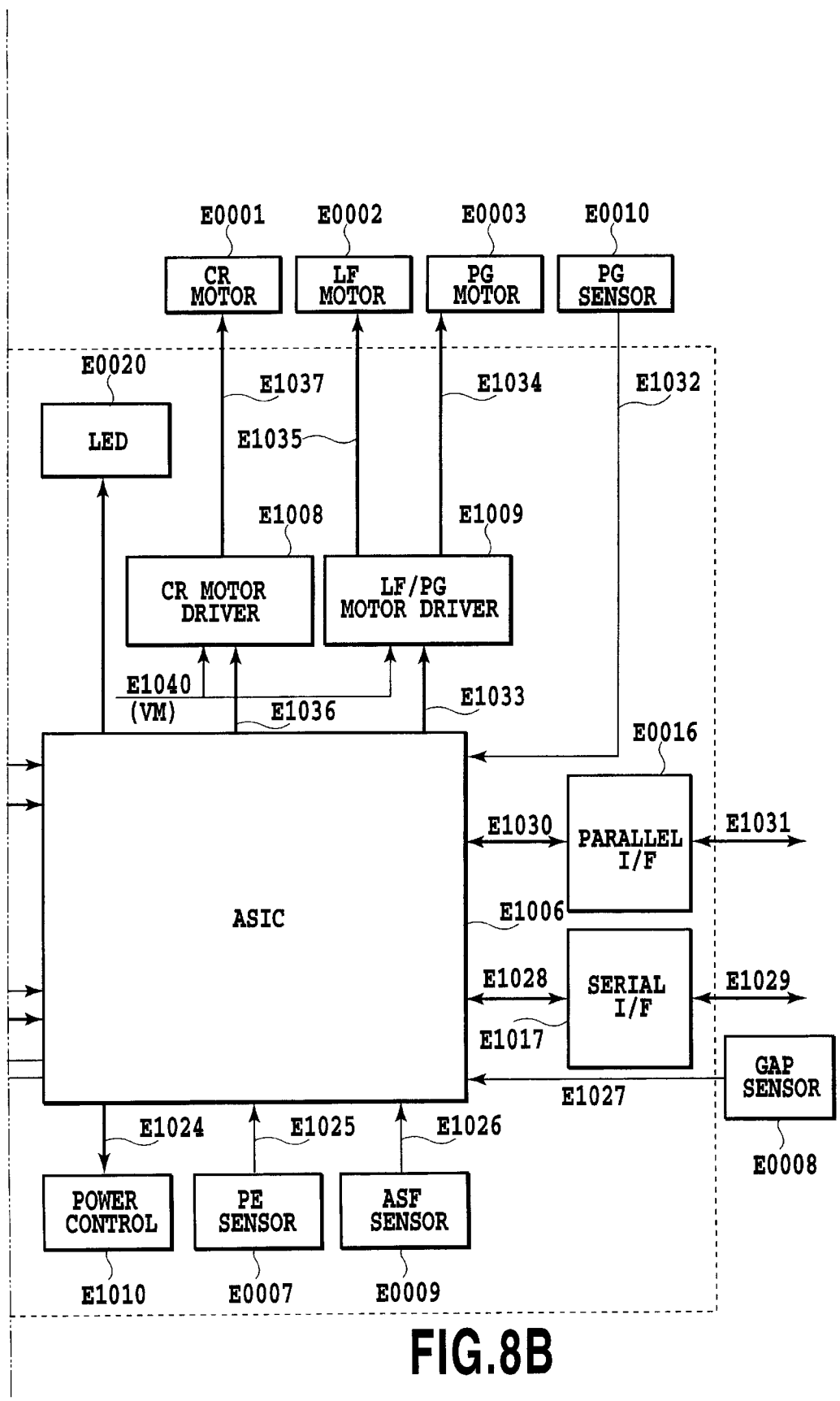

FIG. 8 is a diagram showing the relation between FIGS. 8A and 8B, and FIGS. 8A and 8B are block diagrams showing an inner configuration of the main PCB E0014.

Reference number E1001 represents a CPU, which has a clock generator (CG) E1002 connected to an oscillation circuit E1005 to generate a system clock based on an output signal E1019 of the oscillation circuit E1005. The CPU E1001 is connected to an ASIC (application specific integrated circuit) and a ROM E1004 through a control bus E1014. According to a program stored in the ROM E1004, the CPU E1001 controls the ASIC E1006, checks the status of an input signal E1017 from the power key, an input signal E1016 from the resume key, a cover detection signal E1042 and a head detection signal (HSENS) E1013, drives the buzzer E0021 according to a buzzer signal (BUZ) E1018, and checks the status of an ink empty detection signal (INKS) E1011 connected to a built-in A/D converter E1003 and of a temperature detection signal (TH) E1012 from a thermistor. The CPU E1001 also performs various other logic operations and makes conditional decisions to control the operation of the ink jet printing apparatus.

The head detection signal E1013 is a head mount detection signal entered from the print head cartridge H1000 through the flexible flat cable E0012, the carriage substrate E0013 and the contact FPC E0011. The ink empty detection signal E1011 is an analog signal output from the ink empty sensor E0006. The temperature detection signal E1012 is an analog signal from the thermistor (not shown) provided on the carriage substrate E0013.

Designated E1008 is a CR motor driver that uses a motor power supply (VM) E1040 to generate a CR motor drive signal E1037 according to a CR motor control signal E1036 from the ASIC E1006 to drive the CR motor E0001. E1009 designates an LF/PG motor driver which uses the motor power supply E1040 to generate an LF motor drive signal E1035 according to a pulse motor control signal (PM control signal) E1033 from the ASIC E1006 to drive the LF motor. The LF/PG motor driver E1009 also generates a PG motor drive signal E1034 to drive the PG motor.

Designated E1010 is a power supply control circuit which controls the supply of electricity to respective sensors with light emitting elements according to a power supply control signal E1024 from the ASIC E1006. The parallel I/F E0016 transfers a parallel I/F signal E1030 from the ASIC E1006 to a parallel I/F cable E1031 connected to external circuits and also transfers a signal of the parallel I/F cable E1031 to the ASIC E1006. The serial I/F E0017 transfers a serial I/F signal E1028 from the ASIC E1006 to a serial I/F cable E1029 connected to external circuits, and also transfers a signal from the serial I/F cable E1029 to the ASIC E1006.

The power supply unit E0015 provides a head power signal (VH) E1039, a motor power signal (VM) E1040 and a logic power signal (VDD) E1041. A head power ON signal (VHON) E1022 and a motor power ON signal (VMON) E1023 are sent from the ASIC E1006 to the power supply unit E0015 to perform the ON/OFF control of the head power signal E1039 and the motor power signal E1040. The logic power signal (VDD) E1041 supplied from the power supply unit E0015 is voltage-converted as required and given to various parts inside or outside the main PCB E0014.

The head power signal E1039 is smoothed by a circuit of the main PCB E0014 and then sent out to the flexible flat cable E0011 to be used for driving the print head cartridge H1000. E1007 denotes a reset circuit which detects a reduction in the logic power signal E1041 and sends a reset signal (RESET) to the CPU E1001 and the ASIC E1006 to initialize them.

The ASIC E1006 is a single-chip semiconductor integrated circuit and is controlled by the CPU E1001 through the control bus E1014 to output the CR motor control signal E1036, the PM control signal E1033, the power supply control signal E1024, the head power ON signal E1022 and the motor power ON signal E1023. It also transfers signals to and from the parallel interface E0016 and the serial interface E0017. In addition, the ASIC E1006 detects the status of a PE detection signal (PES) E1025 from the PE sensor E0007, an ASF detection signal (ASFS) E1026 from the ASF sensor E0009, a gap detection signal (GAPS) E1027 from the GAP sensor E0008 for detecting a gap between the print head and the printing medium, and a PG detection signal (PGS) E1032 from the PG sensor E0010, and sends data representing the statuses of these signals to the CPU E1001 through the control bus E1014. Based on the data received, the CPU E1001 controls the operation of an LED drive signal E1038 to turn on or off the LED E0020.

Further, the ASIC E1006 checks the status of an encoder signal (ENC) E1020, generates a timing signal, interfaces with the print head cartridge H1000 and controls the print operation by a head control signal E1021. The encoder signal (ENC) E1020 is an output signal of the CR encoder sensor E0004 received through the flexible flat cable E0012. The head control signal E1021 is sent to the print head H1001 through the flexible flat cable E0012, carriage substrate E0013 and contact FPC E0011.

Figure 9A:
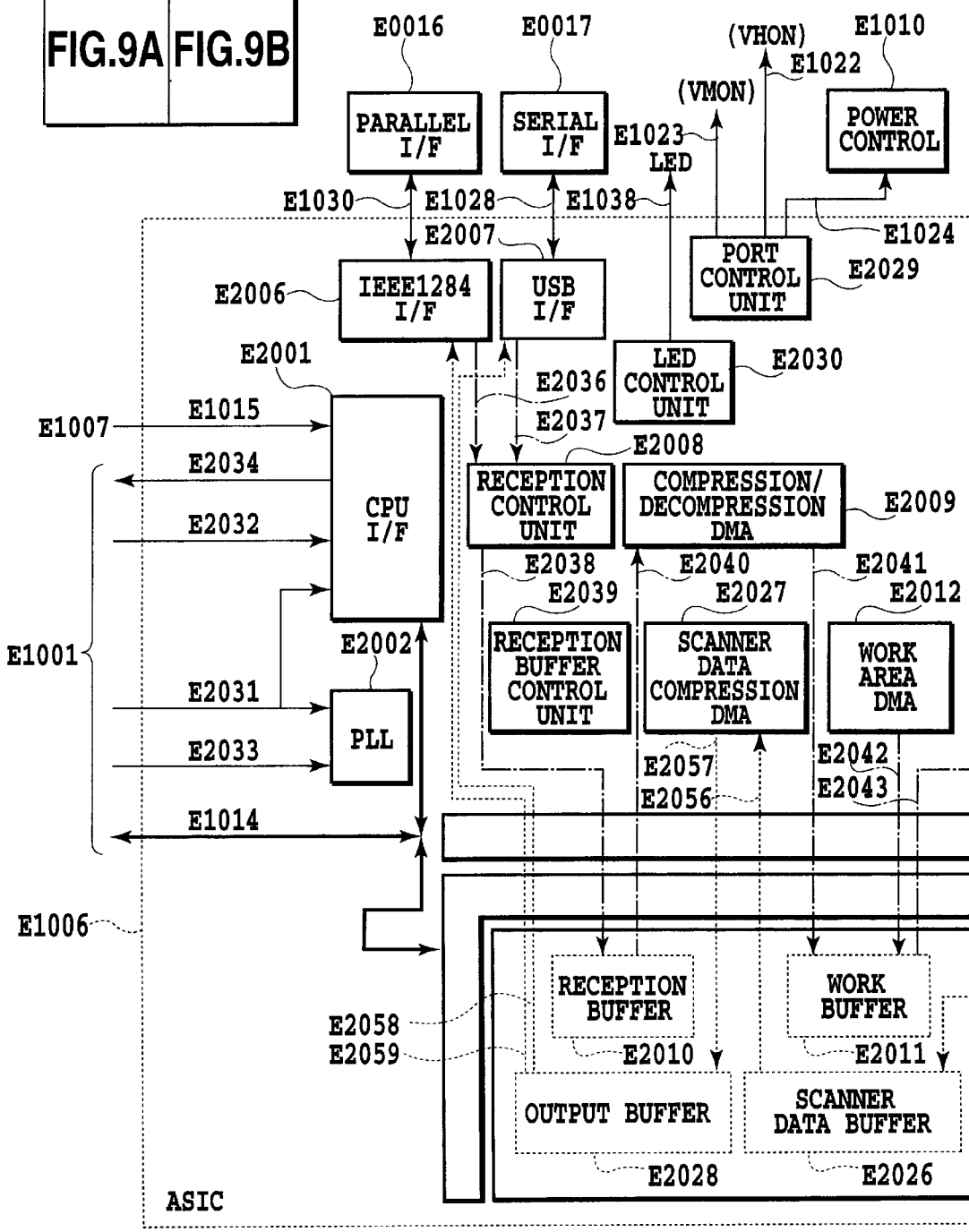
FIG. 9 is a diagram showing the relation between FIGS. 9A and 9B, FIGS. 9A and 9B being block diagrams representing an example inner configuration of an application specific integrated circuit (ASIC) in the main PCB of FIGS. 8A and 8B.
Figure 9B:
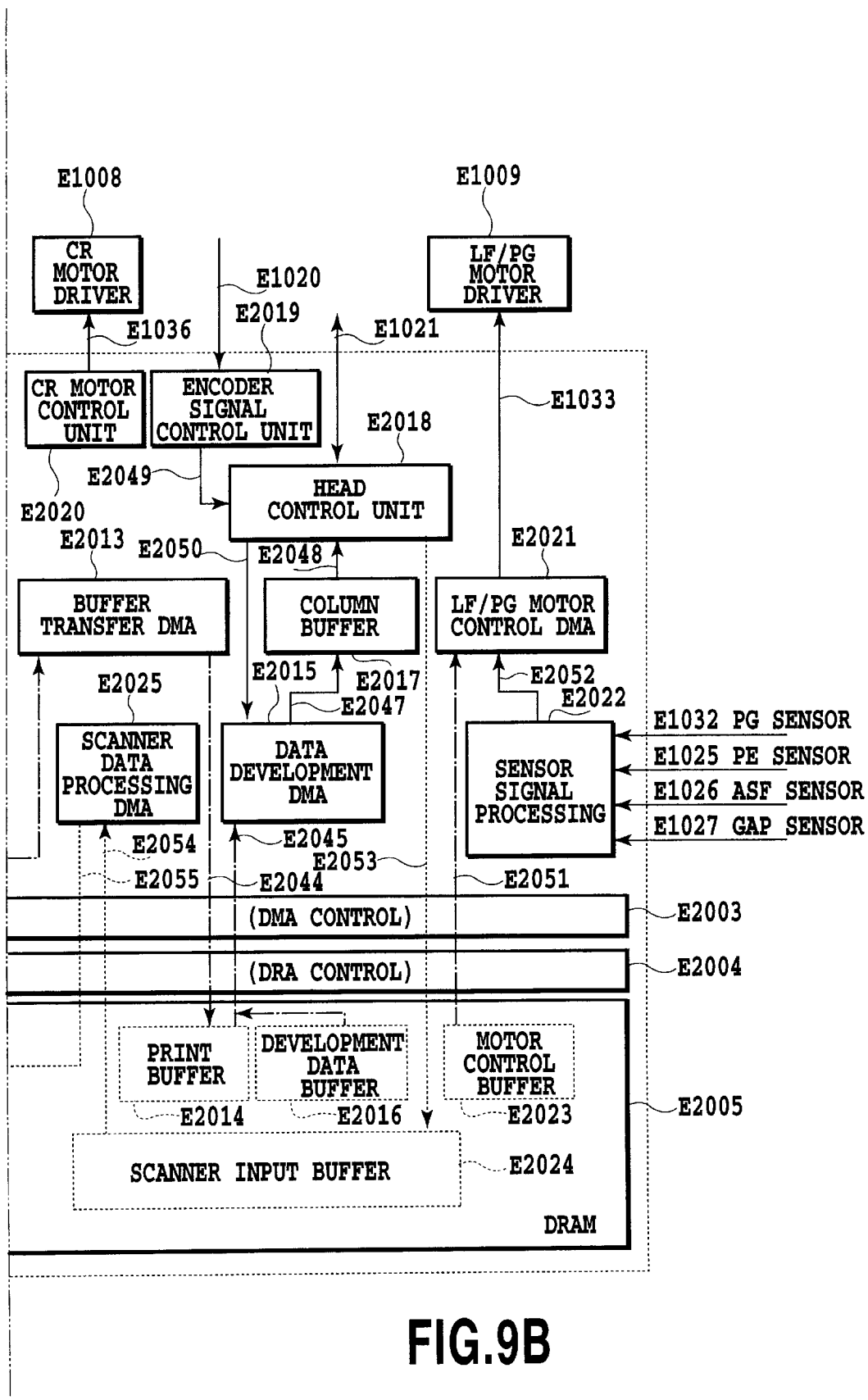

FIG. 9 is a diagram showing the relation between FIGS. 9A and 9B, and FIGS. 9A and 9B are block diagrams showing an example internal configuration of the ASIC E1006.

In these figures, only the flow of data, such as print data and motor control data, associated with the control of the head and various mechanical components is shown between each block, and control signals and clock associated with the read/write operation of the registers incorporated in each block and control signals associated with the DMA control are omitted to simplify the drawing.

In the figures, reference number E2002 represents a PLL controller which, based on a clock signal (CLK) E2031 and a PLL control signal (PLLON) E2033 output from the CPU E1001, generates a clock (not shown) to be supplied to the most part of the ASIC E1006.

Denoted E2001 is a CPU interface (CPU I/F) E2001, which controls the read/write operation of register in each block, supplies a clock to some blocks and accepts an interrupt signal (none of these operations are shown) according to a reset signal E1015, a software reset signal (PDWN) E2032 and a clock signal (CLK) E2031 output from the CPU E1001, and control signals from the control bus E1014. The CPU I/F E2001 then outputs an interrupt signal (INT) E2034 to the CPU E1001 to inform it of the occurrence of an interrupt within the ASIC E1006.

E2005 denotes a DRAM which has various areas for storing print data, such as a reception buffer E2010, a work buffer E2011, a print buffer E2014 and a development data buffer E2016. The DRAM E2005 also has a motor control buffer E2023 for motor control and, as buffers used instead of the above print data buffers during the scanner operation mode, a scanner input buffer E2024, a scanner data buffer E2026 and an output buffer E2028.

The DRAM E2005 is also used as a work area by the CPU E1001 for its own operation. Designated E2004 is a DRAM control unit E2004 which performs read/write operations on the DRAM E2005 by switching between the DRAM access from the CPU E1001 through the control bus and the DRAM access from a DMA control unit E2003 described later.

The DMA control unit E2003 accepts request signals (not shown) from various blocks and outputs address signals and control signals (not shown) and, in the case of write operation, write data E2038, E2041, E2044, E2053, E2055, E2057 etc. to the DRAM control unit to make DRAM accesses. In the case of read operation, the DMA control unit E2003 transfers the read data E2040, E2043, E2045, E2051, E2054, E2056, E2058, E2059 from the DRAM control unit E2004 to the requesting blocks.

Denoted E2006 is an IEEE 1284 I/F which functions as a bi-directional communication interface with external host devices, not shown, through the parallel I/F E0016 and is controlled by the CPU E1001 via CPU I/F E2001. During the printing operation, the IEEE 1284 I/F E2006 transfers the receive data (PIF receive data E2036) from the parallel I/F E0016 to a reception control unit E2008 by the DMA processing. During the scanner reading operation, the 1284 I/F E2006 sends the data (1284 transmit data (RDPIF) E2059) stored in the output buffer E2028 in the DRAM E2005 to the parallel I/F E0016 by the DMA processing.

Designated E2007 is a universal serial bus (USB) I/F which offers a bi-directional communication interface with external host devices, not shown, through the serial I/F E0017 and is controlled by the CPU E1001 through the CPU I/F E2001. During the printing operation, the universal serial bus (USB) I/F E2007 transfers received data (USB receive data E2037) from the serial I/F E0017 to the reception control unit E2008 by the DMA processing. During the scanner reading, the universal serial bus (USB) I/F E2007 sends data (USB transmit data (RDUSB) E2058) stored in the output buffer E2028 in the DRAM E2005 to the serial I/F E0017 by the DMA processing. The reception control unit E2008 writes data (WDIF E2038) received from the 1284 I/F E2006 or universal serial bus (USB) I/F E2007, whichever is selected, into a reception buffer write address managed by a reception buffer control unit E2039.

Designated E2009 is a compression/decompression DMA controller which is controlled by the CPU E1001 through the CPU I/F E2001 to read received data (raster data) stored in a reception buffer E2010 from reception buffer read address managed by the eception buffer control unit E2039, compress or decompress the data (RDWK) E2040 according to a specified mode, and write the data as a print code string (WDWK) E2041 into the work buffer area.

Designated E2013 is a print buffer transfer DMA controller which is controlled by the CPU E1001 through the CPU I/F E2001 to read print codes (RDWP) E2043 on the work buffer E2011 and rearrange the print codes onto addresses on the print buffer E2014 that match the sequence of data transfer to the print head cartridge H1000 before transferring the codes (WDWP E2044). Reference number E2012 denotes a work area DMA controller which is controlled by the CPU E1001 through the CPU I/F E2001 to repetitively write specified work fill data (WDWF) E2042 into the area of the work buffer whose data transfer by the print buffer transfer DMA controller E2013 has been completed.

Designated E2015 is a print data development DMA controller E2015, which is controlled by the CPU E1001 through the CPU I/F E2001. Triggered by a data development timing signal E2050 from a head control unit E2018, the print data development DMA controller E2015 reads the print code that was rearranged and written into the print buffer and the development data written into the development data buffer E2016 and writes developed print data (RDHDG) E2045 into the column buffer E2017 as column buffer write data (WDHDG) E2047. The column buffer E2017 is an SRAM that temporarily stores the transfer data (developed print data) to be sent to the print head cartridge H1000, and is shared and managed by both the print data development DMA CONTROLLER and the head control unit through a handshake signal (not shown).

Designated E2018 is a head control unit E2018 which is controlled by the CPU E1001 through the CPU I/F E2001 to interface with the print head cartridge H1000 or the scanner through the head control signal. It also outputs a data development timing signal E2050 to the print data development DMA controller according to a head drive timing signal E2049 from the encoder signal processing unit E2019.

During the printing operation, the head control unit E2018, when it receives the head drive timing signal E2049, reads developed print data (RDHD) E2048 from the column buffer and outputs the data to the print head cartridge H1000 as the head control signal E1021.

In the scanner reading mode, the head control unit E2018 DMA-transfers the input data (WDHD) E2053 received as the head control signal E1021 to the scanner input buffer E2024 on the DRAM E2005. Designated E2025 is a scanner data processing DMA controller E2025 which is controlled by the CPU E1001 through the CPU I/F E2001 to read input buffer read data (RDAV) E2054 stored in the scanner input buffer E2024 and writes the averaged data (WDAV) E2055 into the scanner data buffer E2026 on the DRAM E2005.

Designated E2027 is a scanner data compression DMA controller which is controlled by the CPU E1001 through the CPU I/F E2001 to read processed data (RDYC) E2056 on the scanner data buffer E2026, perform data compression, and write the compressed data (WDYC) E2057 into the output buffer E2028 for transfer. Designated E2019 is an encoder signal processing unit which, when it receives an encoder signal (ENC), outputs the head drive timing signal E2049 according to a mode determined by the CPU E1001. The encoder signal processing unit E2019 also stores in a register information on the position and speed of the carriage M4001 obtained from the encoder signal E1020 and presents it to the CPU E1100. Based on this information, the CPU E1001 determines various parameters for the CR motor E0001. Designated E2020 is a CR motor control unit which is controlled by the CPU E1001 through the CPU I/F E2001 to output the CR motor control signal E1036.

Denoted E2022 is a sensor signal processing unit which receives detection signals E1032, E1025, E1026 and E1027 output from the PG sensor E0010, the PE sensor E0007, the ASF sensor E0009 and the gap sensor E0008, respectively, and transfers these sensor information to the CPU E1001 according to the mode determined by the CPU E1001. The sensor signal processing unit E2022 also outputs a sensor detection signal E2052 to a DMA controller E2021 for controlling LF/PG motor.

The DMA controller E2021 for controlling LF/PG motor is controlled by the CPU E1001 through the CPU I/F E2001 to read a pulse motor drive table (RDPM) E2051 from the motor control buffer E2023 on the DRAM E2005 and output a pulse motor control signal E1033. Depending on the operation mode, the controller outputs the pulse motor control signal E1033 upon reception of the sensor detection signal as a control trigger.

Designated E2030 is an LED control unit which is controlled by the CPU E1001 through the CPU I/F E2001 to output an LED drive signal E1038. Further, designated E2029 is a port control unit which is controlled by the CPU E1001 through the CPU I/F E2001 to output the head power ON signal E1022, the motor power ON signal E1023 and the power supply control signal E1024.

5. Operation of Printer

Figure 10:
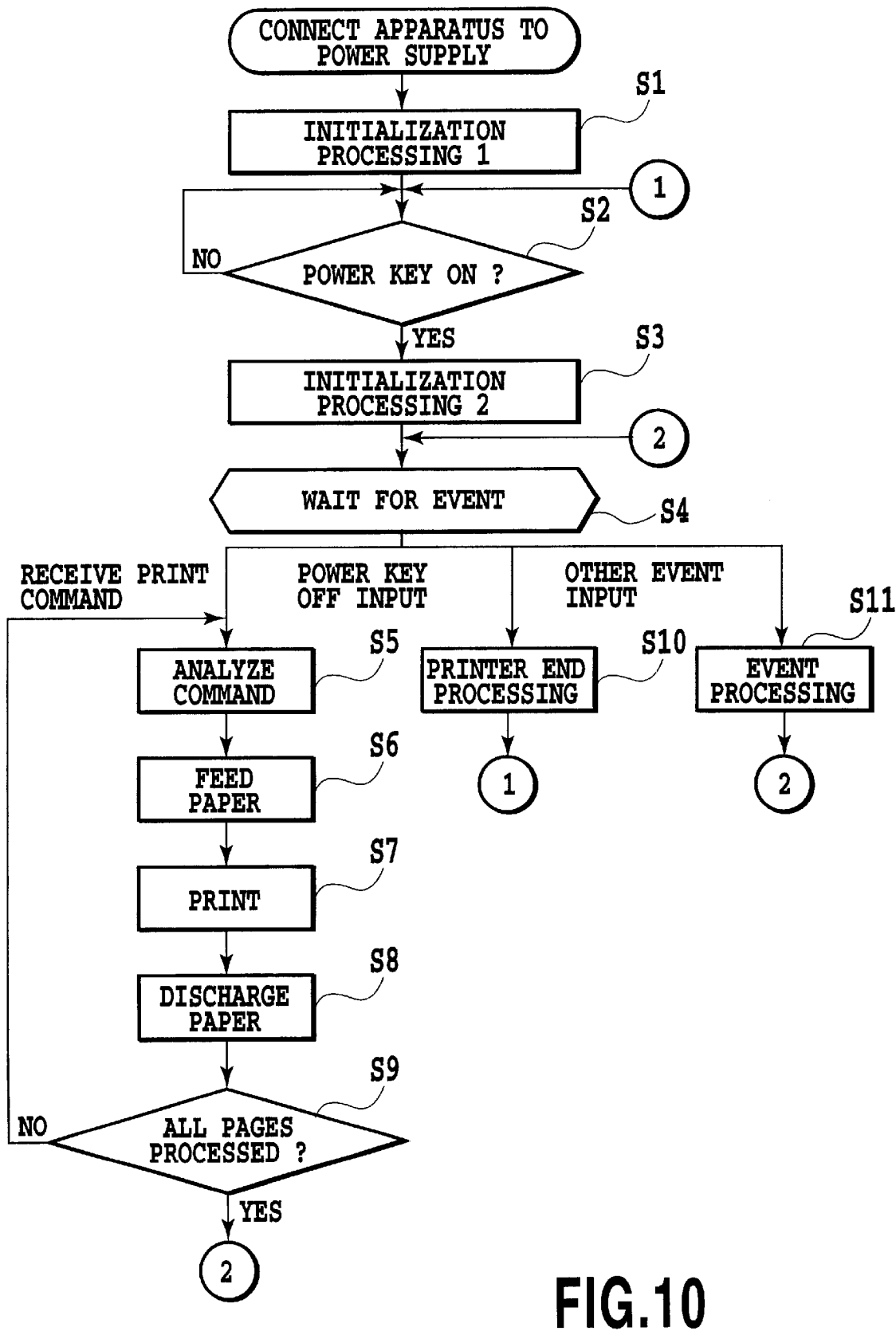
FIG. 10 is a flow chart showing an example of operation of the printer as one embodiment of the present invention.

Next, the operation of the ink jet printing apparatus in this embodiment of the invention with the above configuration will be explained by referring to the flow chart of FIG. 10.

When the printer body M1000 is connected to an AC power supply, a first initialization is performed at step S1. In this initialization process, the electric circuit system including the ROM and RAM in the apparatus is checked to confirm that the apparatus is electrically operable.

Next, step S2 checks if the power key E0018 on the upper case M1002 of the printer body M1000 is turned on. When it is decided that the power key E0018 is pressed, the processing moves to the next step S3 where a second initialization is performed.

In this second initialization, a check is made of various drive mechanisms and the print head of this apparatus. That is, when various motors are initialized and head information is read, it is checked whether the apparatus is normally operable.

Next, steps S4 waits for an event. That is, this step monitors a demand event from the external I/F, a panel key event from the user operation and an internal control event and, when any of these events occurs, executes the corresponding processing.

When, for example, step S4 receives a print command event from the external I/F, the processing moves to step S5. When a power key event from the user operation occurs at step S4, the processing moves to step S10. If another event occurs, the processing moves to step S11.

Step S5 analyzes the print command from the external I/F, checks a specified paper kind, paper size, print quality, paper feeding method and others, and stores data representing the check result into the DRAM E2005 of the apparatus before proceeding to step S6.

Next, step S6 starts feeding the paper according to the paper feeding method specified by the step S5 until the paper is situated at the print start position. The processing moves to step S7.

At step S7 the printing operation is performed. In this printing operation, the print data sent from the external I/F is stored temporarily in the print buffer. Then, the CR motor E0001 is started to move the carriage M4001 in the main-scanning direction. At the same time, the print data stored in the print buffer E2014 is transferred to the print head H1001 to print one line. When one line of the print data has been printed, the LF motor E0002 is driven to rotate the LF roller M3001 to transport the paper in the sub-scanning direction. After this, the above operation is executed repetitively until one page of the print data from the external I/F is completely printed, at which time the processing moves to step S8.

At step S8, the LF motor E0002 is driven to rotate the paper discharge roller M2003 to feed the paper until it is decided that the paper is completely fed out of the apparatus, at which time the paper is completely discharged onto the paper discharge tray M1004.

Next at step S9, it is checked whether all the pages that need to be printed have been printed and if there are pages that remain to be printed, the processing returns to step S5 and the steps S5 to S9 are repeated. When all the pages that need to be printed have been printed, the print operation is ended and the processing moves to step S4 waiting for the next event.

Step S10 performs the printing termination processing to stop the operation of the apparatus. That is, to turn off various motors and print head, this step renders the apparatus ready to be cut off from power supply and then turns off power, before moving to step S4 waiting for the next event.

Step S11 performs other event processing. For example, this step performs processing corresponding to the ejection performance recovery command from various panel keys or external I/F and the ejection performance recovery event that occurs internally. After the recovery processing is finished, the printer operation moves to step S4 waiting for the next event.

A form of application where the present invention can effectively be implemented is the ink jet print head in which thermal energy generated by an electrothermal transducer is used to cause film boiling in a liquid to form a bubble.

(First Embodiment)

Next, a first embodiment that is a characteristic component of the present invention will be described.

Figure 11:
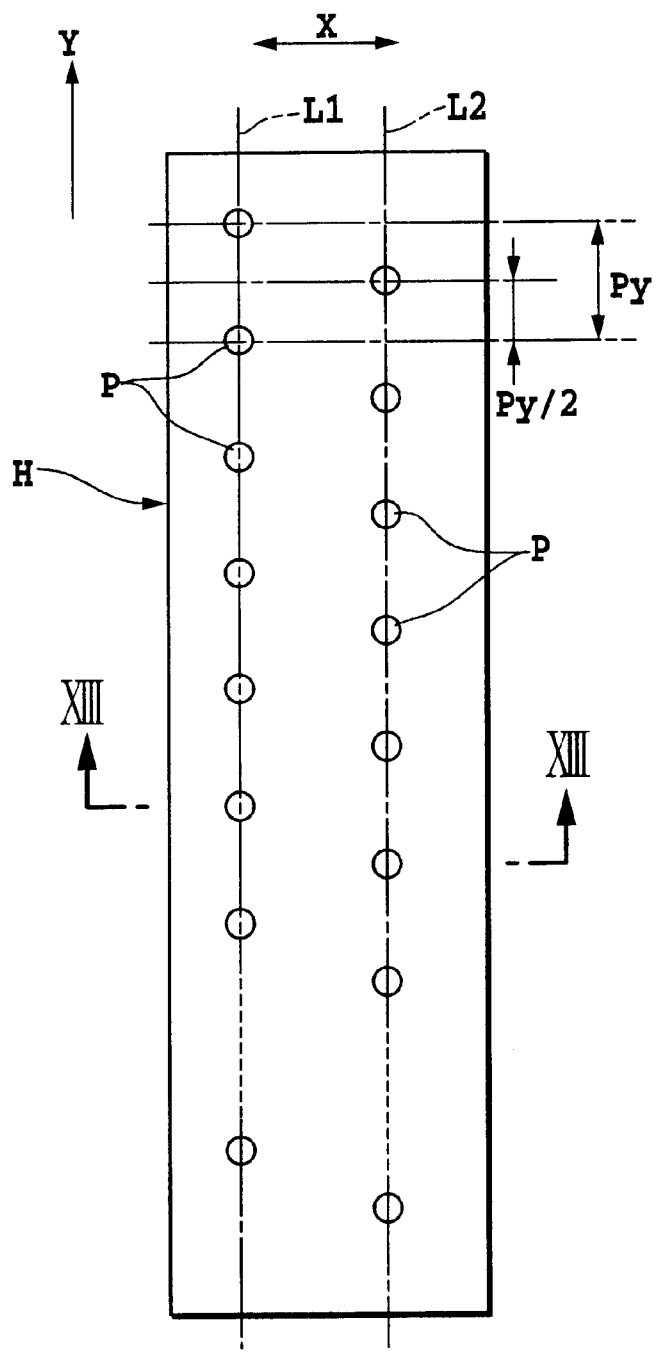
FIG. 11 is a schematic view showing the construction of the print head used in the first embodiment and which is a characteristic component of the present invention, as viewed from the nozzle side.
Figure 12:
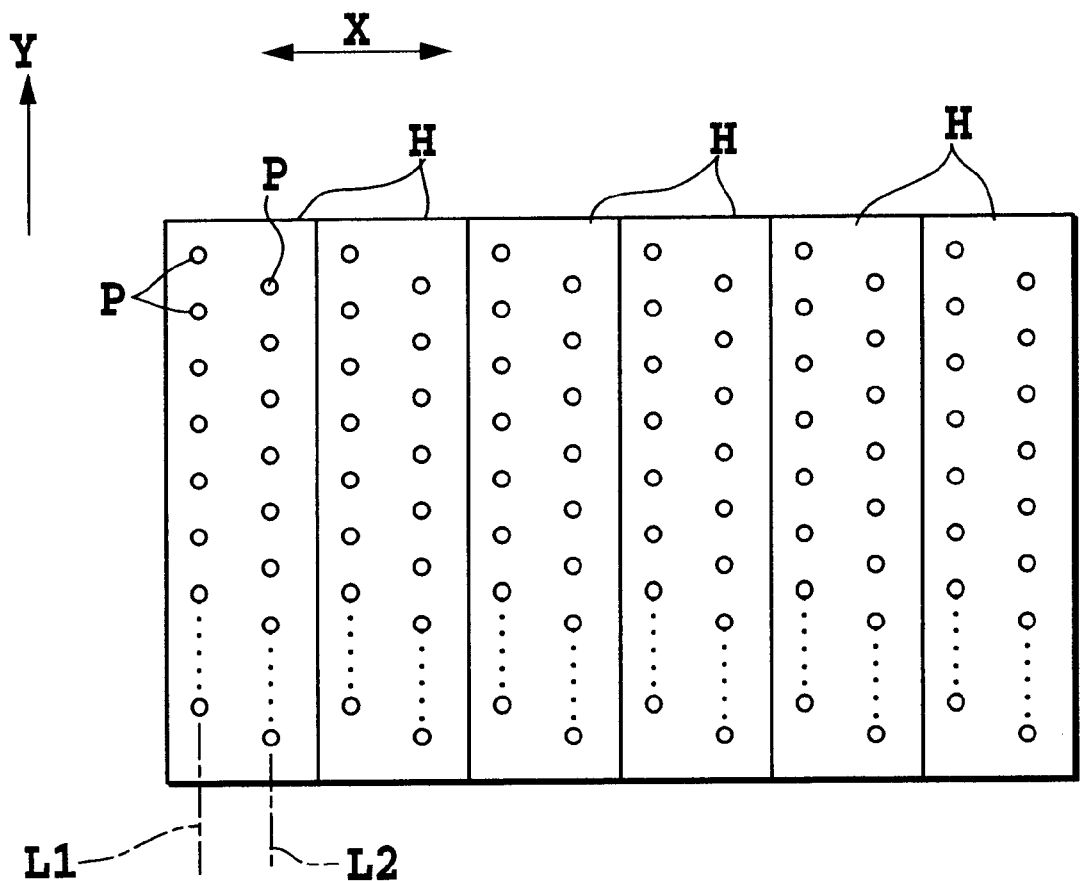
FIG. 12 is an explanatory illustration where a plurality of print heads such as the one shown in FIG. 11 are used.
Figure 13:
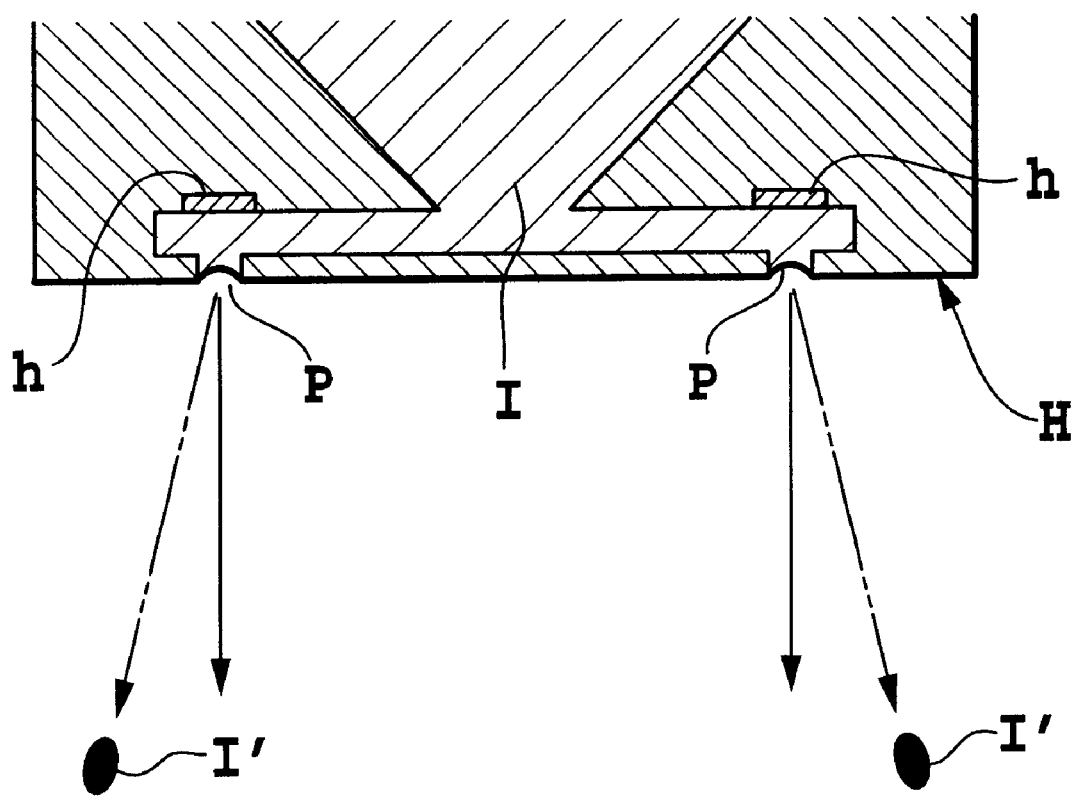
FIG. 13 is an enlarged sectional view taken along line XIII—XIII of FIG. 11.
Figure 14:
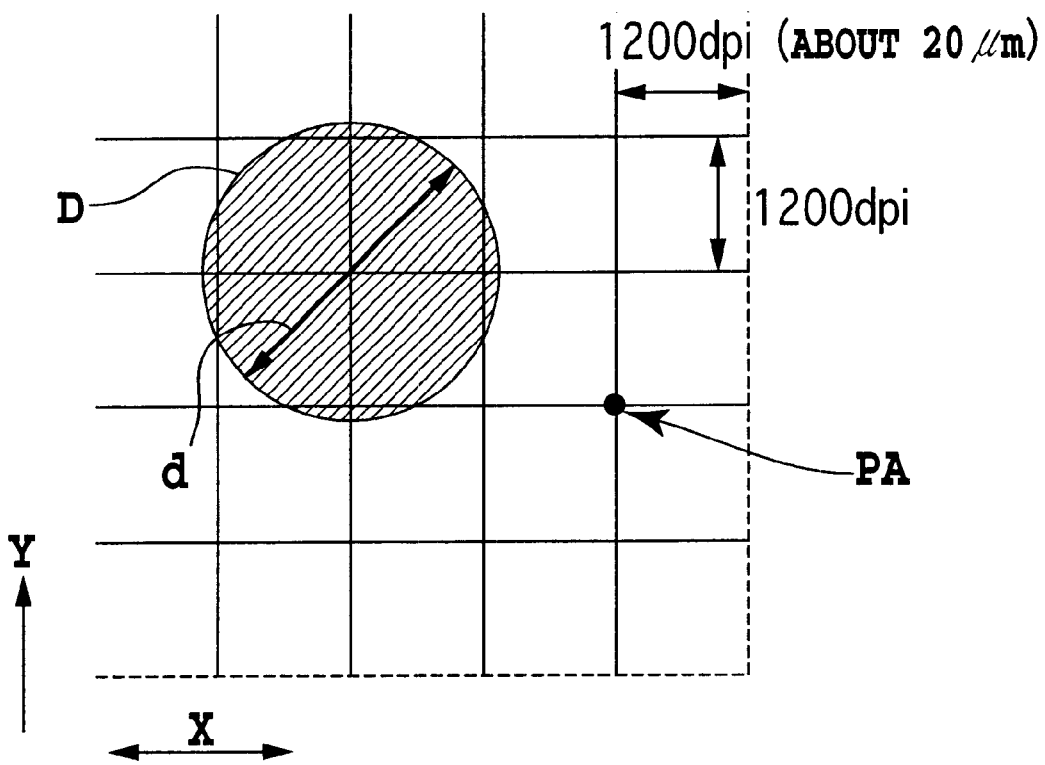
FIG. 14 is an explanatory illustration of basic lattice points according to the first embodiment and which is a characteristic component of the present invention.
Figure 15:
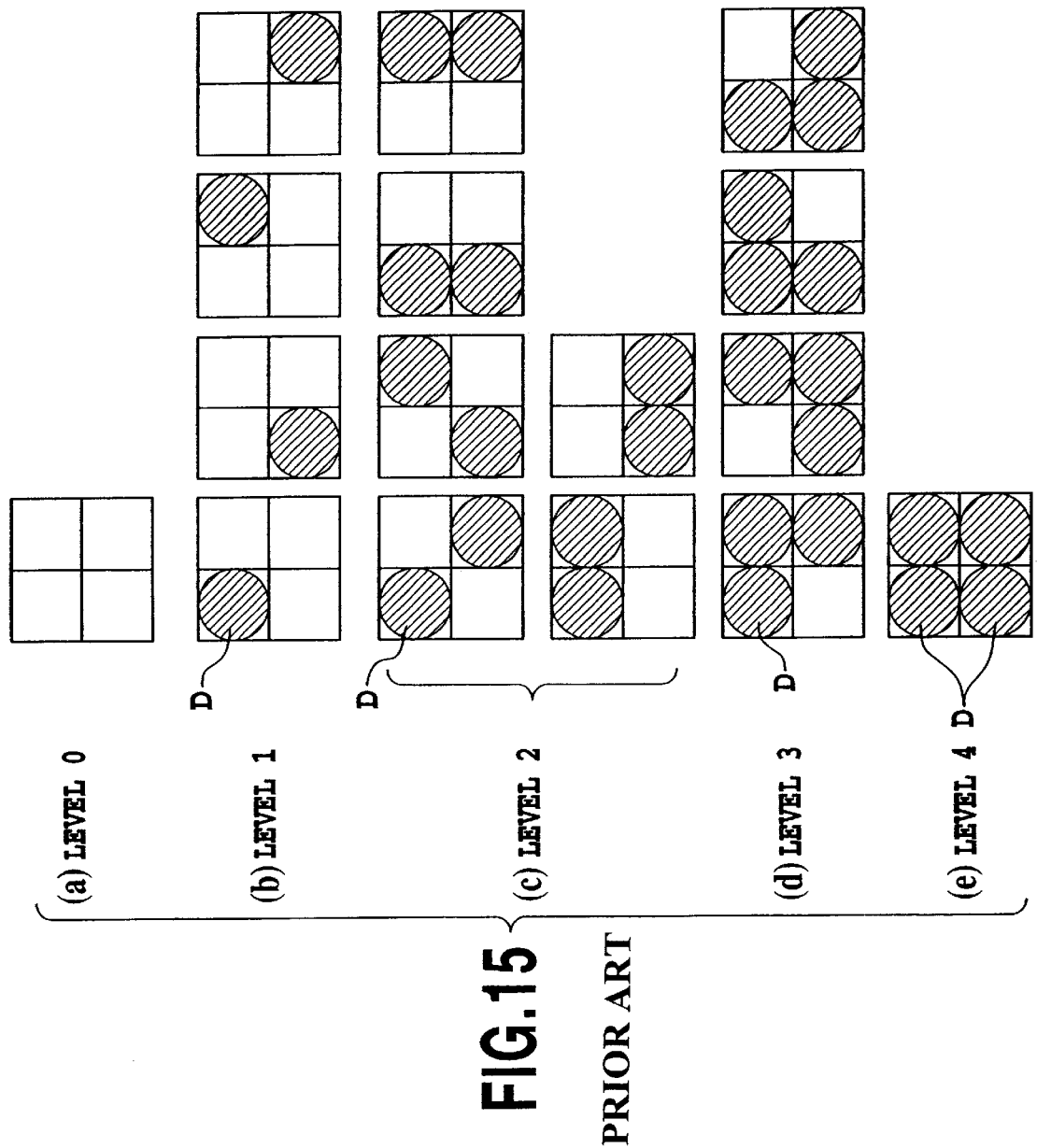
FIG. 15 is an explanatory illustration of dot arrangement patterns for use in a conventional printing system.
Figure 16:
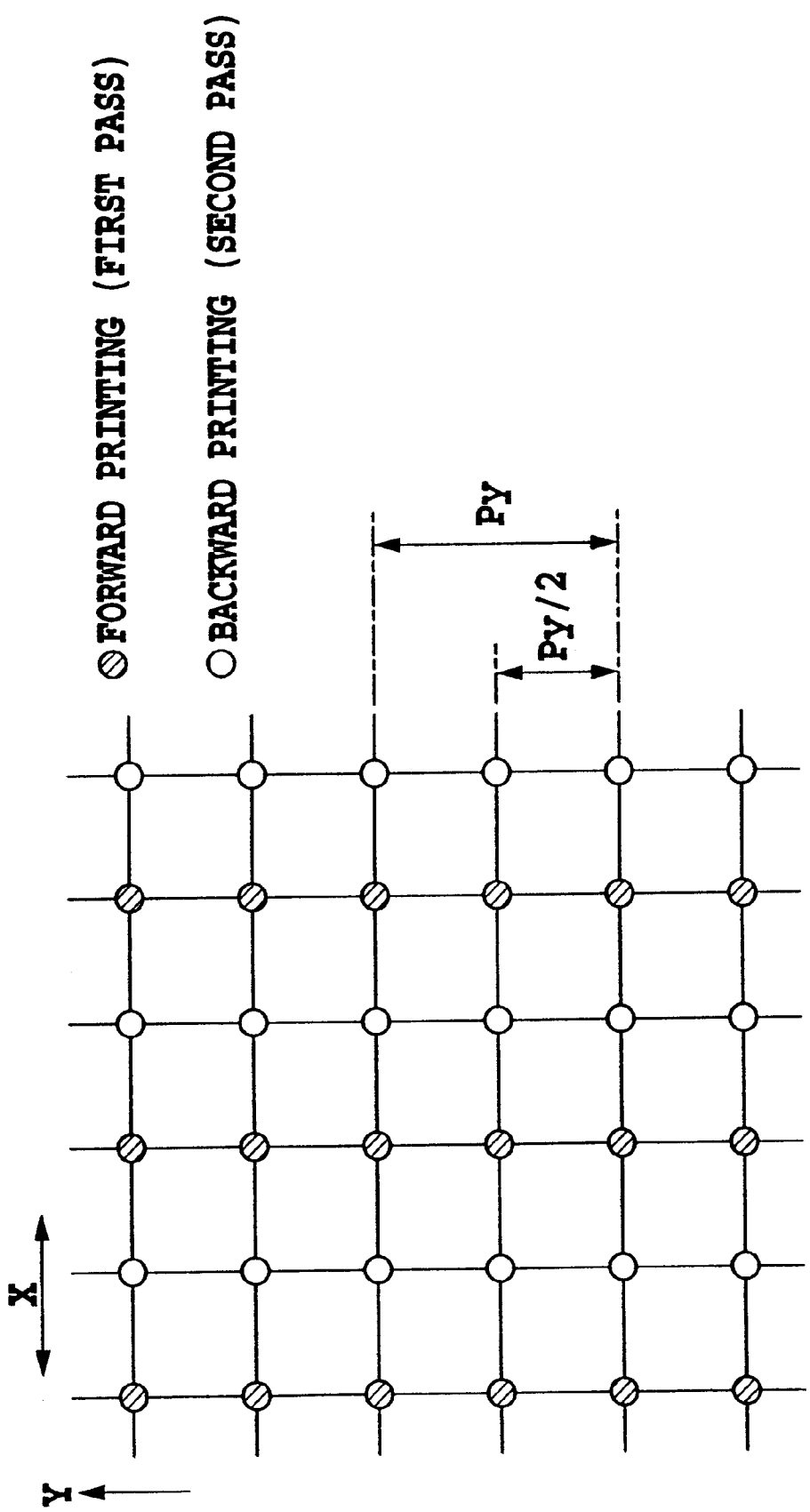
FIG. 16 is an explanatory illustration of printing lattice points in the conventional printing system.

In this embodiment, a print head H constructed similarly to the ones described for the conventional example in FIGS. 11 to 13 is used as the print head H1001 mounted on the carriage M4001. In this example, 128 ejection ports P (for 128 nozzles) are formed in each of nozzle rows L1 and L2 of the print head H at a pitch Py corresponding to 600 dpi. Further, the ejection ports P in the nozzle row L1 are offset from the corresponding ejection nozzles P in the nozzle row L2 by half a pitch (Py/2) corresponding to 1,200 dpi in the sub-scanning direction shown by the arrow Y. When the same color ink is ejected from the ejection ports P in the two rows, an image can be printed with a dot density of 1200 dpi in the sub-scanning direction. The ejection frequency (Hz) for the print head H and the movement speed of the carriage M4001 (the scanning speed of the print head H) Vc (inch/sec.) have a relationship Vc=f/1,200. Thus, an image can be printed with a dot density of 1,200 dpi also in the main-scanning direction shown by the arrow X. Accordingly, the print head H has a printing resolution of 1,200 dpi×1,200 dpi. Consequently, with the print head H, the distance between basic lattice points, shown in FIG. 16, can be set at about 20 μm corresponding to 1,200 dpi so that dots can be formed at the printing lattice points. Moreover, the size of dots formed on a printing medium by the print head H depends on the type of the ink or printing medium, but they have a diameter of about 40 to 50 μm. FIG. 14 represents the relationship between dots D of about 45 μm diameter and basic lattice points PA.

In the following description, nozzles including the ejection ports P are imparted with nozzle numbers 1, 2, 3, . . . 256 from the top to the bottom of FIG. 11. The odd-number-th nozzles (nozzles 1, 3, 5, . . . 255) are located on the nozzle row L1, whereas the even-number-th nozzles (nozzles 2, 4, 6, . . . 256) are located on the nozzle row L2.

In this example, the print head H has a printing resolution of 1,200 dpi, whereas image data input to the printing apparatus by the host apparatus has a resolution of 600×600 ppi. Here, ppi represents pixels per inch. The printing apparatus can print one image data using 2×2=4 pixels. In this case, the image data is expressed in a printing area of 2×2=4 pixels and with five gradations from "level 0" to "level 4", using a preset dot arrangement pattern.

To further improve the printing quality, this example employs an 8-pass bi-directional column thinning printing system. The print head H repeats printing during forward scanning for odd-number-th passes (first, third, fifth, and seventh passes) and printing during backward scanning for even-number-th passes (second, fourth, sixth, and eighth passes), and the impact positions of ink droplets are offset between forward scanning and backward scanning by half the distance between the basic lattice points in the main-scanning direction (this distance corresponds to 2,400 dpi). Consequently, the printing resolution in the main-scanning direction is 2,400 dpi, whereas the printing resolution in the sub-scanning direction is 1,200 dpi (2,400×1,200 dpi). The resolution of the image data input to the printing apparatus by the host apparatus remains unchanged, that is, 600×600 ppi. To deal with a 2,400×1,200 dpi printing mode, the printing apparatus expresses one image data of 600×600 ppi resolution using eight pixels comprised of four pixels in the main-scanning direction and two pixels in the sub-scanning direction.

In this example, a color image is printed using a plurality of color inks including dark and light inks. The dark inks provide six gradations from "level 0" to "level 5", and the light inks provide nine gradations from "level 0" to "level 8". The dark inks provide fewer gradations than the light inks because the former do not substantially contribute to improving the printing density even with overlapping printing compared to the latter.

Figure 17:
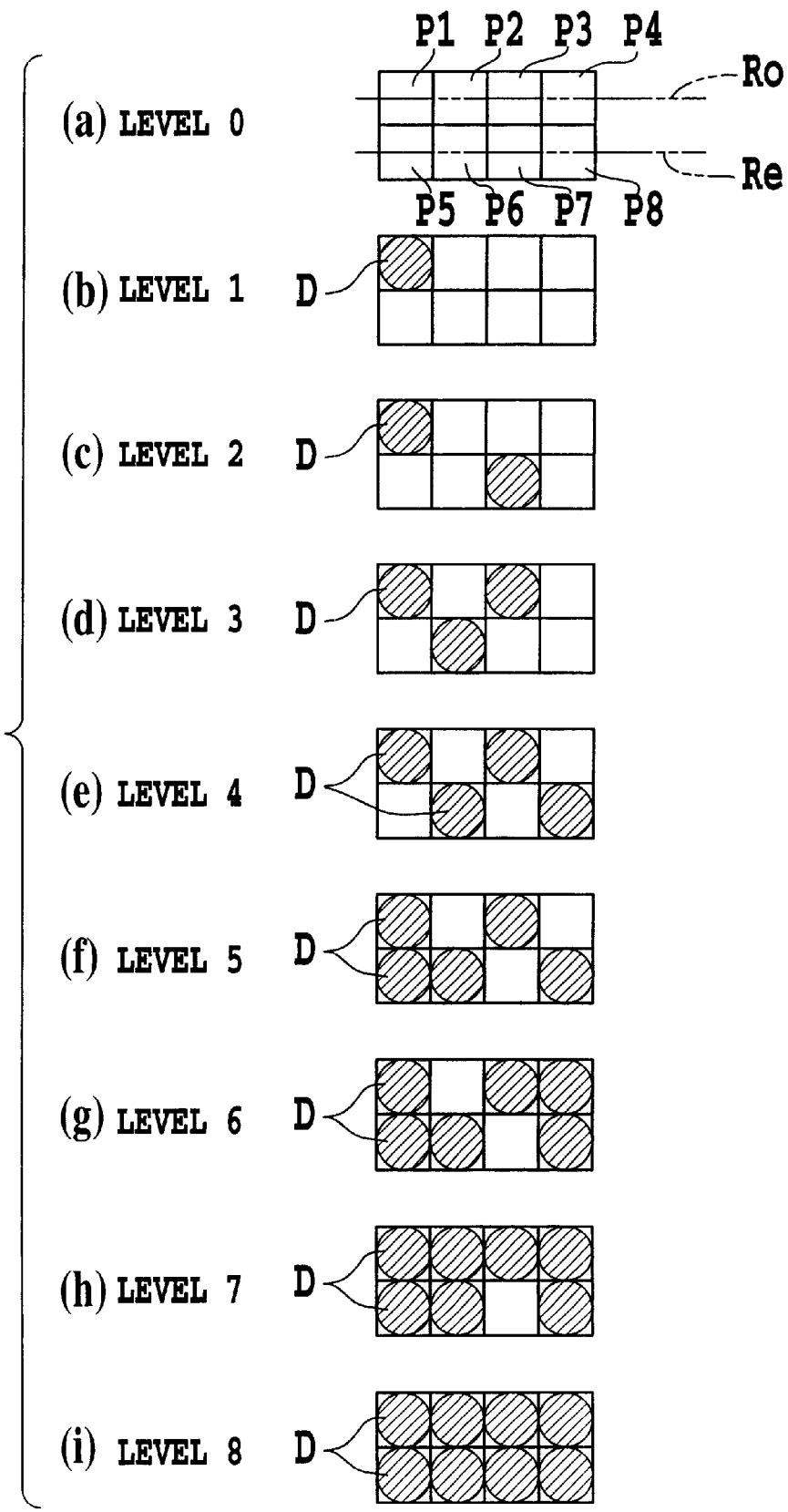
FIG. 17 is an explanatory illustration of referential examples of dot arrangement patterns corresponding to nine gradation levels of image data.

In FIG. 17, reference signs (a) to (i) denote referential examples of arrangement patterns of dots (hereafter referred to as "dot arrangement patterns") corresponding to nine gradations from "level 0" to "level 8".

If the smoothness of a printed image is to be emphasized, one arrangement pattern is preferably set for each gradation as shown in FIG. 17. In the arrangement patterns in FIG. 17, the dots D are arranged substantially equally in eight pixels (pixels P1 to P8) composed of four pixels in the main-scanning direction and two pixels in the sub-scanning direction, thus making the printed image more uniform. The pixels P1 to P4 are printed by the nozzles on the nozzle row L1 (odd-number-th nozzles), whereas the pixels P5 to P8 are printed by the nozzles on the nozzle row L2 (even-number-th nozzles). Raster Ro in which the pixels P1 to P4 are located are called "odd raster", whereas raster Re in which the pixels P5 to P8 are located are called "even raster".

In the referential examples in FIG. 17, however, some nozzles are more frequently used than the others. That is, in the "level 1" denoted by reference sign (b), the pixel P1 is formed only by the odd-number-th nozzles. Additionally, in the "level 3" denoted by reference sign (d), the two pixels P1 and P3 are formed by the odd-number-th nozzles, and the one pixel P6 is formed by the even-number-th nozzle. Accordingly, the ratio of the frequency with which the odd-number-th nozzles are used to the frequency with which the even-number-th nozzles are used is 2:1; again, the odd-number-th nozzles are more frequently used than the even-number-th nozzles. If the particular nozzles are thus overloaded, the lifetimes of the frequently used nozzles determine and thus reduce the lifetime of the print head. Accordingly, with the multi-nozzle head as shown in FIG. 11, the nozzles are desirably used as equally as possible.

Figure 18:
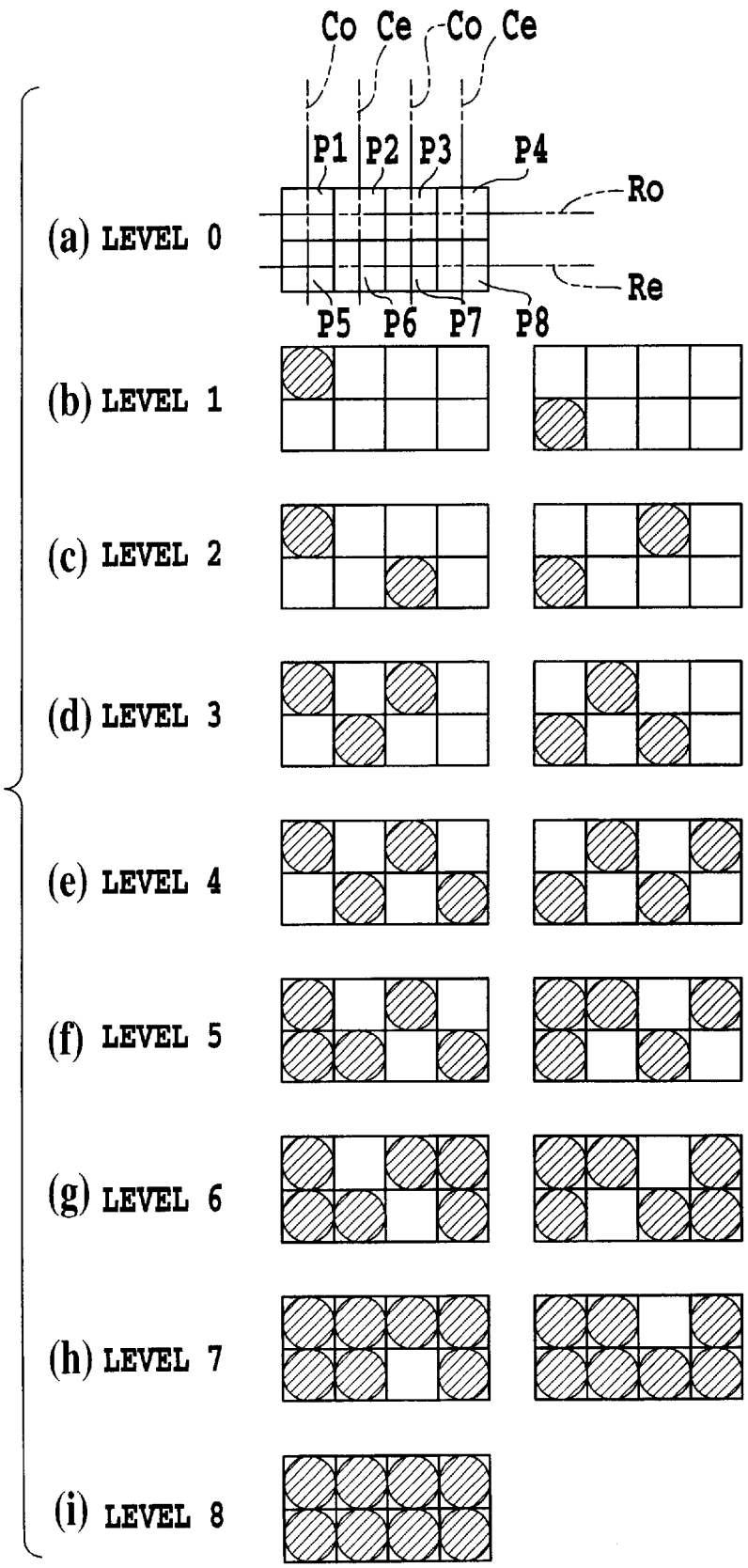
FIG. 18 is an explanatory illustration of other referential examples of dot arrangement patterns corresponding to nine gradation levels of image data.

In FIG. 18, reference signs (a) to (i) denote referential examples of dot arrangement patterns set so that the nozzles are used as equally as possible, while the image is kept uniform. In FIG. 18, two arrangement patterns are alternately used for a "level 1" to a "Level 7" so that the dots D are equally formed in the odd raster Ro and in the even raster Re. The odd- and even-number-th nozzles are equally loaded, while the image is kept uniform.

Figure 19:
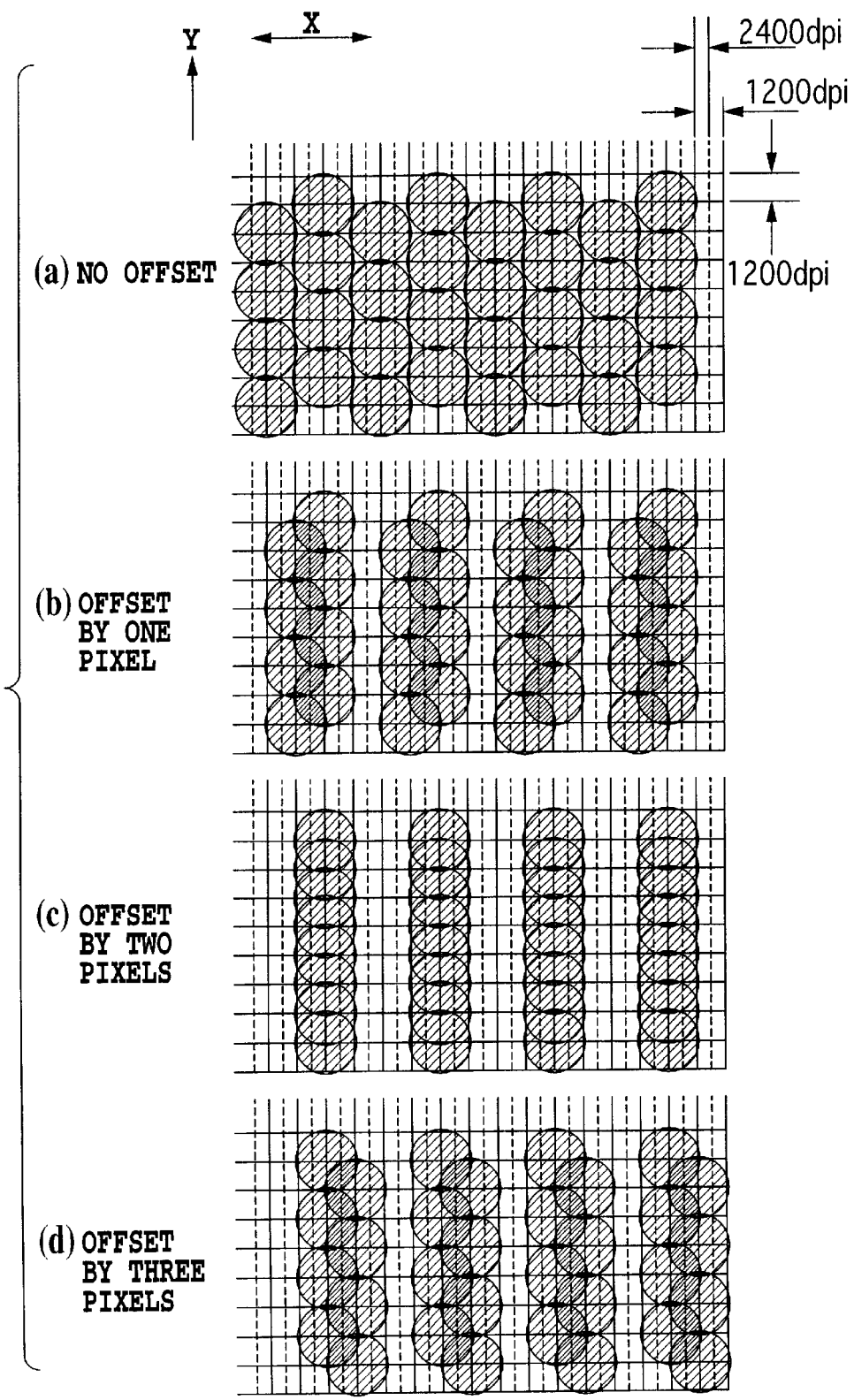
FIG. 19 is an explanatory illustration of the positional offset of dots in a "level 1" printing area, denoted by reference sign (a) in FIG. 18.

In the arrangement patterns shown in FIG. 18, a problem occurs if the impact positions of ink droplets, that is, dot forming positions are offset between the even raster Ro and the odd raster Re. This is denoted by reference signs (a) to (d) in FIG. 19. FIG. 19 shows that in the "level 1" printing area denoted by reference sign (b) in FIG. 18, only the even raster Re is shifted leftward in FIG. 19 one pixel at a time (denoted by reference signs (b) to (d) in FIG. 19) starting with a state where the dot arrangement positions are not offset between the odd raster Ro and the even raster Re (denoted by reference sign (a) in FIG. 19). Compared to the dot arrangement with no offset denoted by reference sign in FIG. 19, when the raster is shifted one pixel as denoted by reference sign (b) in FIG. 19, the dots partly overlap each other. When the raster is shifted two pixels as denoted by reference sign (c) in FIG. 19, the dots are substantially arranged in a line in the vertical direction of the figure. When the dots overlap each other, the rate of non-printing area on the printing medium increases, thus causing a viewer to sense a low printing density. The ratio of a dot forming surface formed using a dot arrangement pattern to the printed surface of the printing medium corresponding to the printing range of that dot arrangement pattern is called "coverage". The coverage is smallest when the raster is shifted two pixels as denoted by reference sign (c) in FIG. 19, increases again when the raster is shifted three pixels denoted by reference sign (d) in FIG. 19, and returns to its original value when the raster is shifted four pixels.

Figure 20:
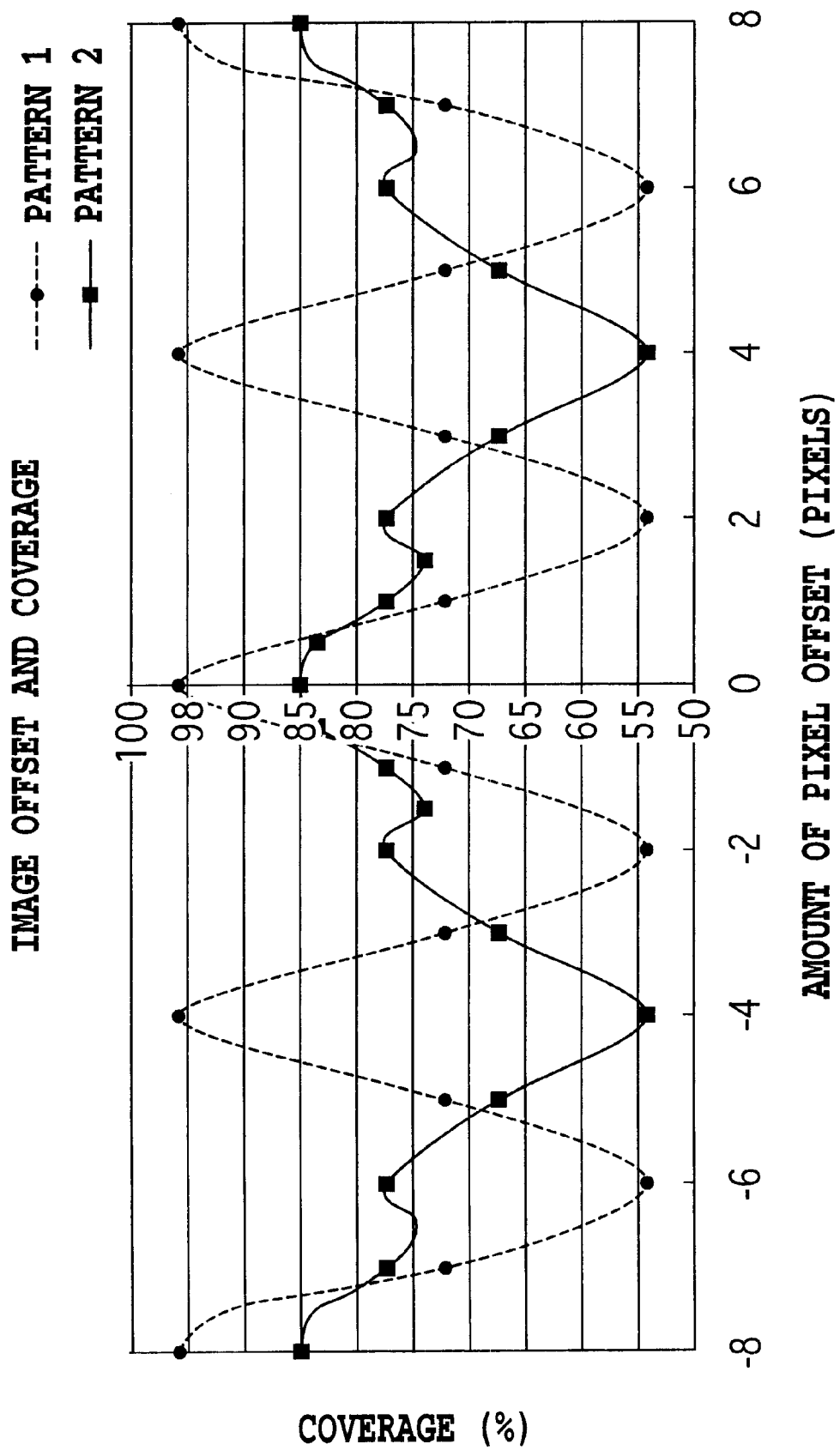
FIG. 20 is an explanatory illustration of the relationship between image offset and coverage in a "level 1" denoted by reference sign (b) in FIG. 18 and in a "level 1" according to a first embodiment that is a characteristic component of the present invention.

A pattern 1, shown by the dotted line in FIG. 20, shows the relationship between this coverage and the dot offset. It shows that the coverage varies between 55 and 95% within a four-pixel period when the dot forming positions are shifted four pixels.

Further, with the 8-pass bi-directional column thinning printing system employed in this example, odd columns Co are printed during the odd-number-th passes (first, third, fifth, and seventh passes), and even columns Ce are printed during the even-number-th passes (second, fourth, sixth, and eighth passes), thereby obtaining a printing resolution of 2,400 dpi in the main-scanning direction, which is double the basic printing density (1,200 dpi). Thus, with the 8-pass bi-directional column thinning printing system, the pixels are printed on the same raster during eight passes of the print head H using the eight nozzles. Consequently, the offset (biasing) of the ink ejecting direction of each nozzle and the variation of the amount of ink ejected have weak influence. If, however, the dots are present only in the odd columns Co as in the "level 1" denoted by reference sign (a) in FIG. 18, they are formed only during the odd-number-th passes (first, third, fifth, and seventh passes), and the printing operation is performed using only half of the eight nozzles. Consequently, the offset (biasing) of the ink ejecting direction of each nozzle and the variation of the amount of ink ejected have strong influence.

Figure 21:
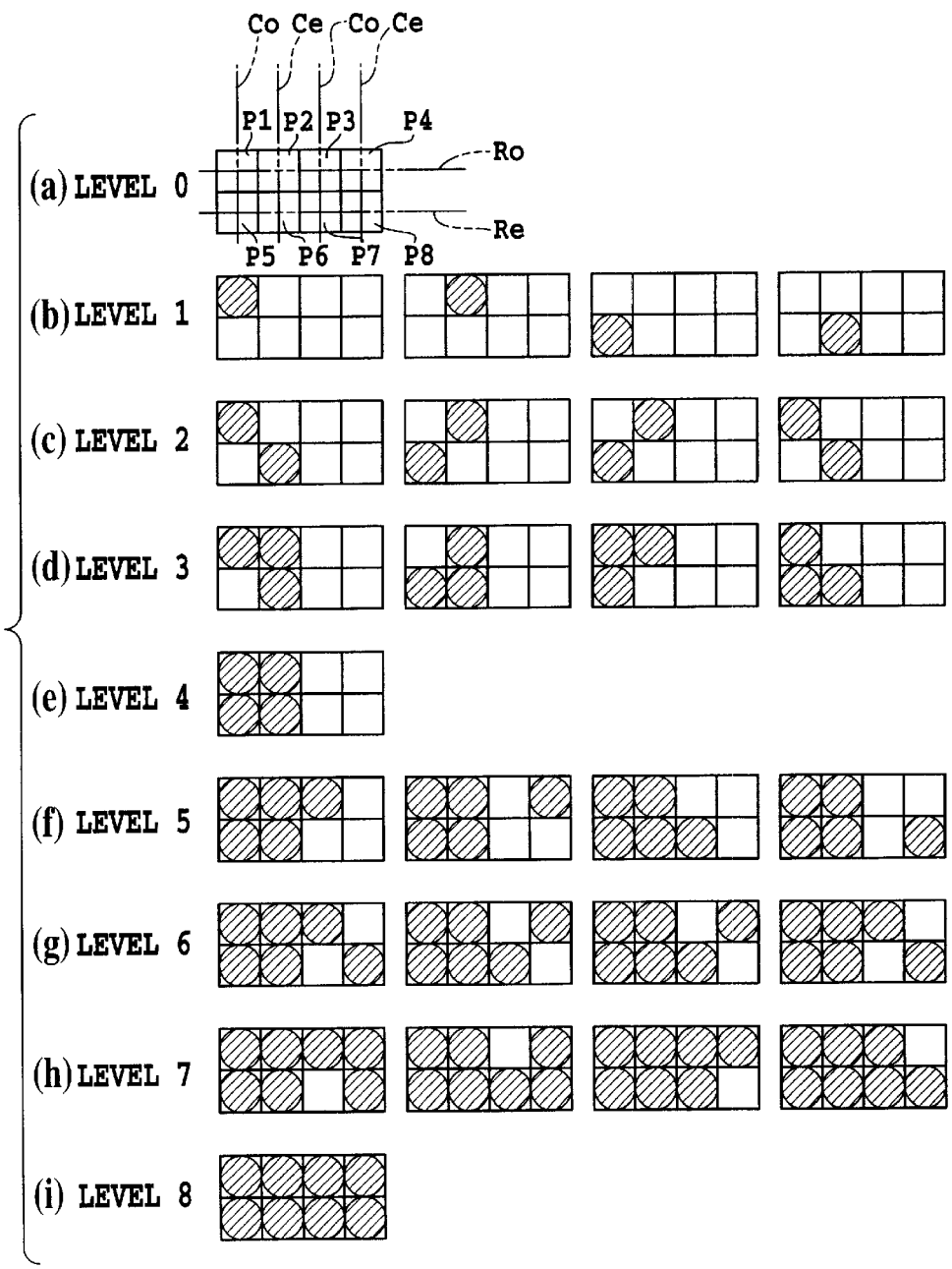
FIG. 21 is an explanatory illustration of dot arrangement patterns according to the first embodiment that is a characteristic component of the present invention.

In FIG. 21, reference signs (a) to (i) denote dot arrangement patterns for use in the first embodiment of the present invention.

As denoted by reference signs (b), (d), (f), and (h) in FIG. 21, four types of dot arrangement patterns are used for a "level 1", a "level 3", a "level 5", and a "level 7" in the order shown in the lateral direction of the figure. As denoted by reference signs (c) and (g) in FIG. 21, two types of dot arrangement patterns are used for a "level 2" and a "level 6" in the order shown in the lateral direction of the figure. These arrangement patterns serve to equally arrange the dots D in the odd raster Ro and in the even raster Re, while equally arranging the dots D in the odd columns Co and in the even columns Ce. As a result, the odd- and even-number-th nozzles can be equally loaded, while the image is kept uniform. Further, the printing operation can be performed with no bias between the odd- and even-number-th passes of the print head H.

Figure 22:
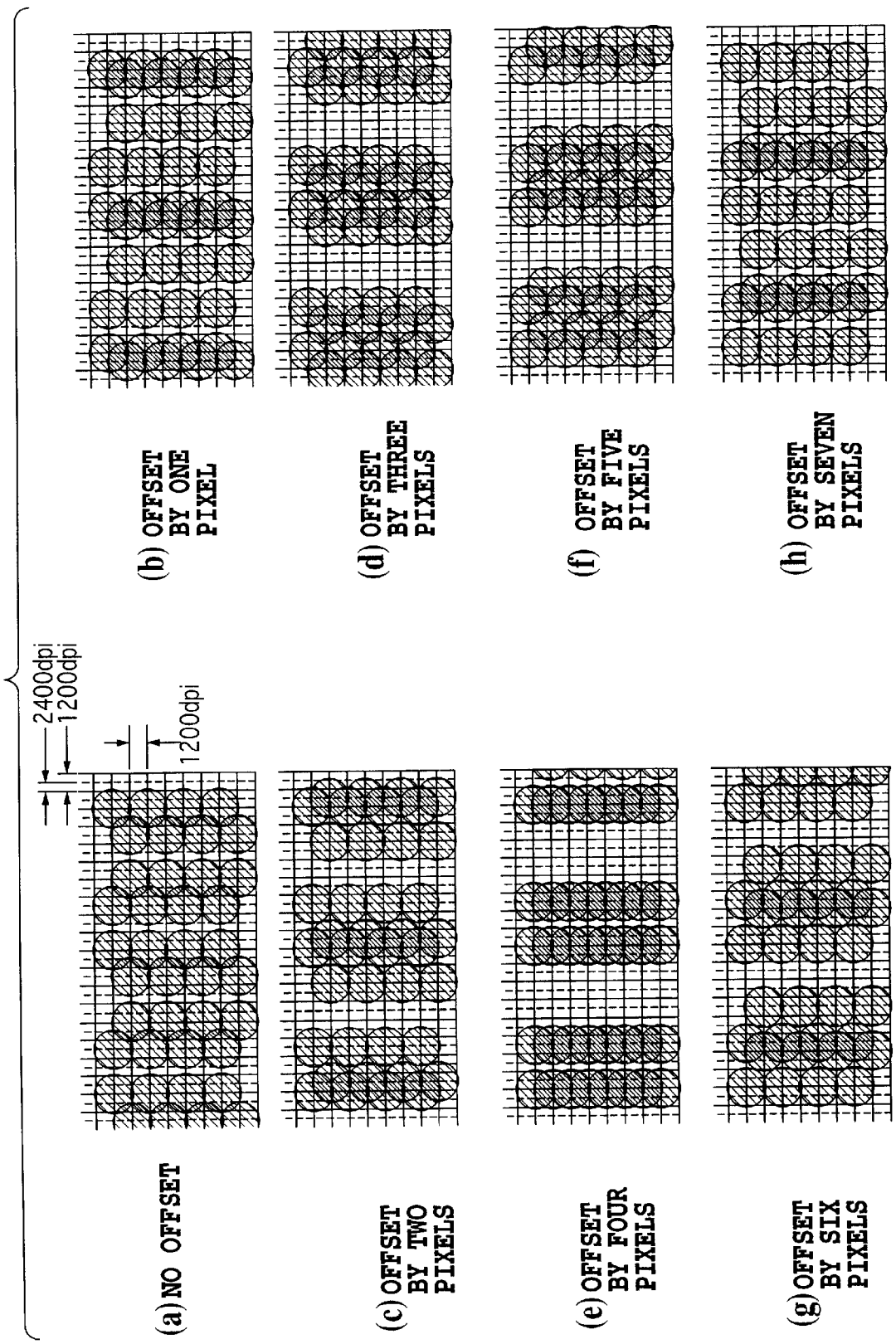
FIG. 22 is an explanatory illustration of the positional offset of dots in a "level 1" printing area, denoted by reference sign (a) in FIG. 21.

In FIG. 22, reference signs (a) to (h) denote that in the "level 1" printing area denoted by reference sign (b) in FIG. 21, only the even raster Re is shifted leftward in FIG. 21 one pixel at a time (denoted by reference signs (b) to (h) in FIG. 19) starting with a state where the dot arrangement positions are not offset between the odd rasters Ro and the even rasters Re (denoted by reference sign (a) in FIG. 19). A pattern 2, shown by the solid line in FIG. 20, shows the relationship between the coverage and the dot offset in this case. It shows that the coverage varies by only about 10% even if the dot forming positions are shifted about two pixels.

In the above description, the dot arrangement at the "level 1" has been emphasized. This is because if in the dot arrangement at the "level 1", the dot forming positions are shifted between the odd raster Ro and the even raster Re, the coverage varies significantly to create a problem. For the gradations at the "level 2" and higher, since the entire printing area is filled with the dots, the problem is not so severe as in the "level 1", but the adverse effects of the offset are similar. In particular with the light ink, the overlapping dots contribute to increasing the density, so that not only the coverage but also the change rate of the area of overlapping dots are important. Variations in coverage and in the area of overlapping dots are noticeable in a uniform dot arrangement such as the "level 4". Accordingly, not only the dot arrangement at the "level 1" but also the dot arrangement at the "level 4" must be focused on.

Figure 23:
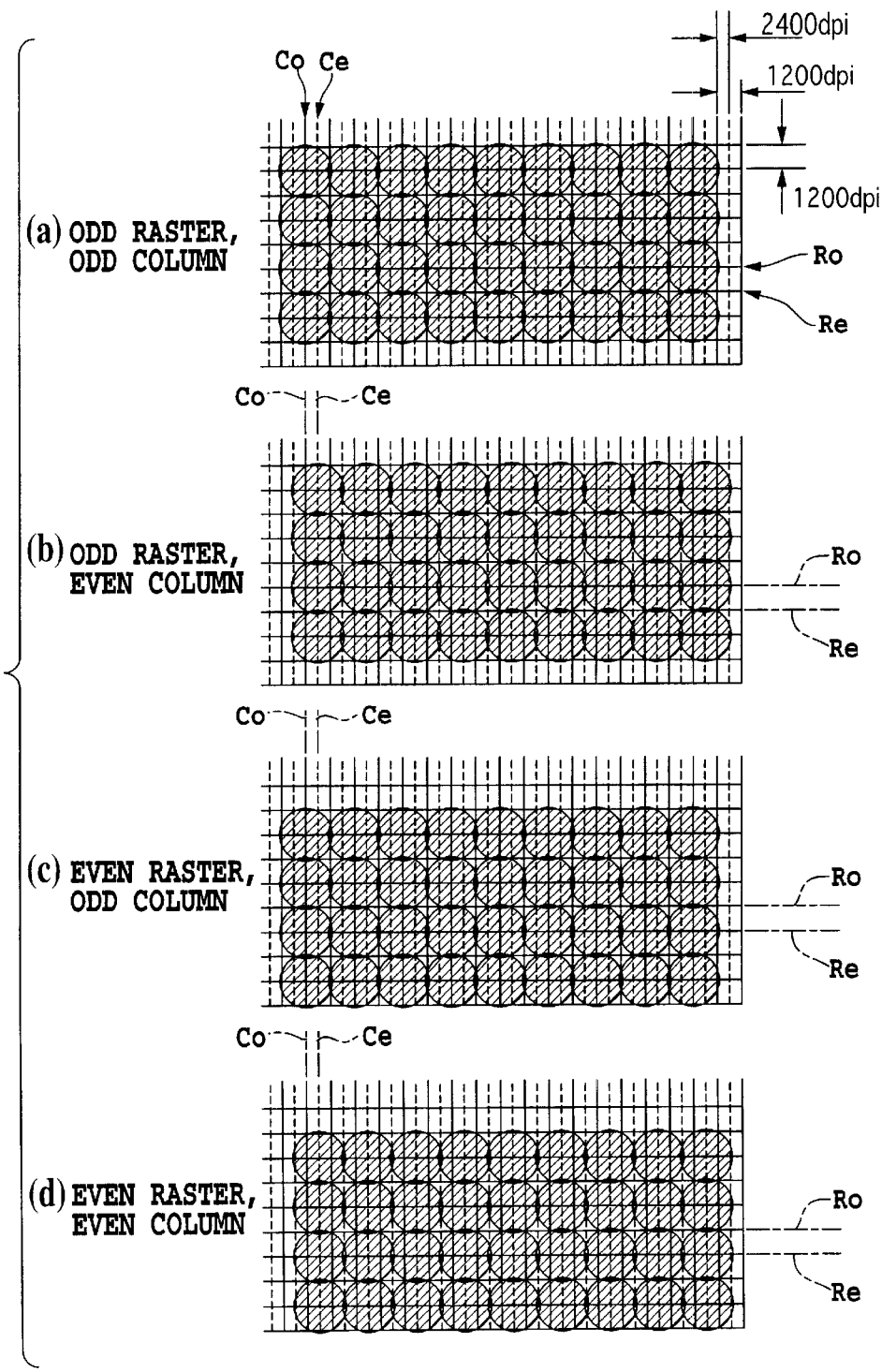
FIG. 23 is an explanatory illustration of dot forming positions in a "level 4" printing area, denoted by reference sign (e) in FIG. 21, which are represented four views.

In this example, one type of arrangement pattern as denoted by reference sign (e) in FIG. 21 is used as the arrangement pattern at the "level 4". In FIG. 23, reference signs (a) to (d) denote arrangements of the dots formed using the "level 4" arrangement pattern denoted by reference sign (e) in FIG. 21, wherein the arrangements are represented in four different views. That is, reference sign (a) in FIG. 23 denotes an arrangement of the dots forming the pixel P1 on the odd rasters Ro and on the odd columns Co, reference sign (b) in FIG. 23 denotes an arrangement of the dots forming the pixel P2 on the odd rasters Ro and on the even columns Ce, reference sign (c) in FIG. 23 denotes an arrangement of the dots forming the pixel P5 on the even rasters Re and on the odd columns Co, and reference sign (d) in FIG. 23 denotes an arrangement of the dots forming the pixel P6 on the even rasters Re and on the even columns Ce. In each of these four dot arrangements, the coverage is 90% or more and the dots are uniformly distributed. Thus, even if the dot arrangement is offset between the odd raster Ro and the even raster Re and between the odd column Co and the even column Ce, the variation of the manner of dot overlapping, that is, the coverage is small, that is, 10% or less. Consequently, these dot arrangements are excellent in achieving uniform printing.

The arrangement pattern for achieving a coverage of almost 100% as shown in FIG. 23 is not limited to the one denoted by reference sign (e) in FIG. 21 but may be an arbitrary one that can achieve an equal dot arrangement between every two adjacent rasters (between each odd raster Ro and the corresponding even raster Re) and between every two adjacent columns (between each odd column Co and the corresponding even column Ce). The coverage of almost 100% can be obtained by, for example, using an arrangement pattern such as the one denoted by reference signs (a) or (b) in FIG. 24, as the "level 4" arrangement pattern.

In FIG. 25, reference signs (a) and (b) denote plural types of arrangement patterns used as the "level 4" arrangement pattern. In FIG. 25, as denoted by reference signs (a) and (b), two types of arrangement patterns are used in the orders laterally shown in the figure. In FIG. 26, reference signs (a) to (d) denote arrangements of the dots formed using the "level 4" arrangement pattern denoted by reference sign (a) in FIG. 25, wherein the arrangements are represented in four different views. That is, reference sign (a) in FIG. 26 denotes an arrangement of the dots formed on the odd rasters Ro and on the odd columns Co, reference sign (b) in FIG. 26 denotes an arrangement of the dots formed on the odd rasters Ro and on the even column Ce, reference sign (c) in FIG. 26 denotes an arrangement of the dots formed on the even rasters Re and on the odd columns Co, and reference sign (d) in FIG. 26 denotes an arrangement of the dots formed on the even rasters Re and on the even columns Ce. Likewise, reference signs (a) to (d) in FIG. 27 denote, in four different views, arrangements of the dots formed using the "level 4" arrangement pattern denoted by reference sign (b) in FIG. 25. If the plural types of arrangement patterns are used as in FIG. 26 and FIG. 27, the dot arrangements of every four are significantly biased. Thus, it is evident that the coverage varies significantly when the dot arrangement is offset between the odd rasters RO and the even rasters Re and between the odd columns Co and the even columns Ce.

(Second Embodiment)

In the 8-pass bi-directional column thinning printing system in the above described embodiment, the impact positions of ink droplets are offset between forward scanning and backward scanning by half the distance between the basic lattice points in the main-scanning direction (this distance corresponds to 2,400 dpi), thus achieving a printing resolution of 2,400 dpi in the main-scanning direction. In this manner, in the column thinning printing method, when the dot impact positions are offset in the main-scanning direction by 1/M of the distance between the basic lattice points, a M-fold printing resolution is achieved.

This embodiment uses the characteristic of the column thinning printing system that a M-fold printing resolution is achieved. In the following description, an 8-pass bi-directional column thinning printing system with M=2 will be taken by way of example, as in the above described embodiment.

In this 8-pass bi-directional column thinning printing system, the dots in the odd columns are printed during the forward scanning for the odd-number-th passes of the print head H, while the dots in the even columns are printed during the backward scanning for the even-number-th passes of the print head H, as described above. Thus, whether the printing operation is performed during the forward scanning of the print head H or the backward printing thereof can be selected depending on the allotment of dot arrangements for each (4×2) dot printing area composed of four dots in the main-scanning direction and two dots in the sub-scanning direction, that is, the allotment of dot arrangements for the odd columns or the even columns.

In this case, the printed image may be degraded due to the disturbance of the image caused by the offset (biasing) of the ink ejecting direction of each nozzle of the print head or the variation of the amount of ink ejected, as well as non-uniform colors arising from differences in coloring caused by changes in the ink overlapping order associated with the bi-directional printing. The disturbance of the image is noticeable in low- and intermediate-density printing areas having lower dot densities, whereas the non-uniform colors are noticeable in a high-density printing area having a high dot density. This is because the offset of the impact positions of ink droplets caused by the offset (biasing) of the ink ejecting direction of each nozzle is noticeable in the low- and intermediate-density printing areas, whereas in the high-density printing area, having a high coverage, the offset (biasing) of the ink ejecting direction of each nozzle is unlikely to be perceived as an offset of the impact positions of ink droplets.

To avoid the disturbance of the image in the low- and intermediate-density printing areas, the prior art employs a multipass printing system for printing one raster during a plurality of scanning operations performed by the print head H or a system for printing one raster using a plurality of nozzles. On the other hand, to prevent non-uniform colors, the prior art employs a method of increasing the number of print heads for printing one raster (multipass number) or adjusting the printing rate for previously printed dots using a mask.

The present invention employs the above described column thinning printing system to enable either bi-directional or unidirectional printing to be selected depending on the gradation level.

Figure 28:
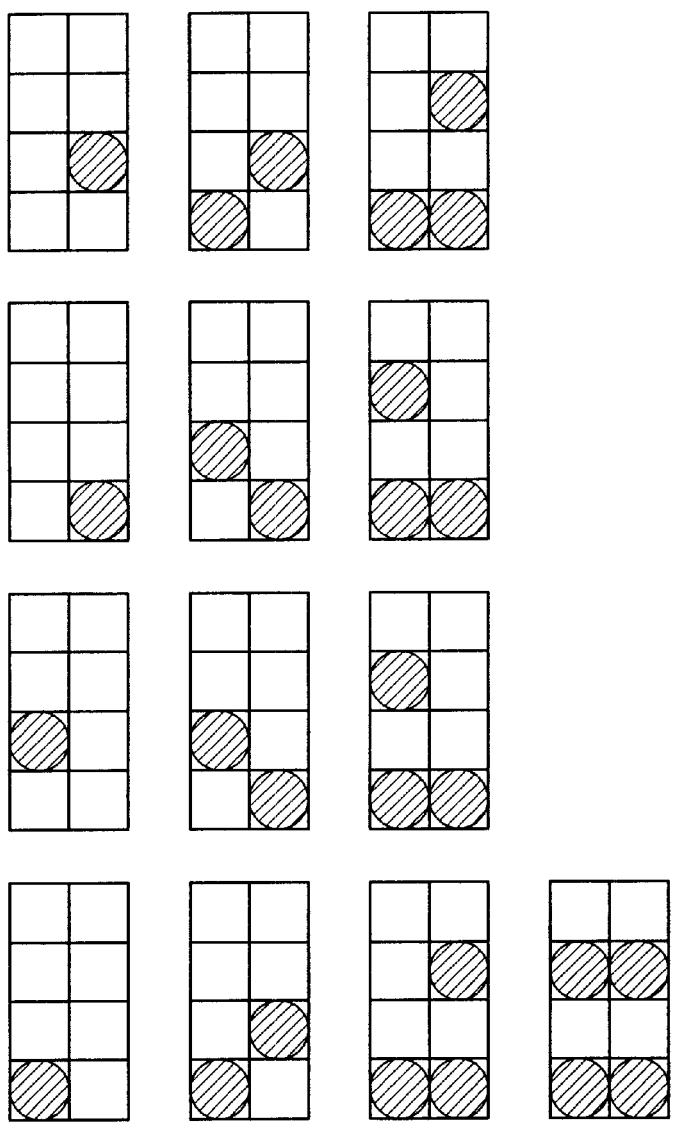
FIG. 28 is an explanatory illustration of dot arrangement patterns according to a second embodiment that is a characteristic component of the present invention.

For example, the "level 1", "level 2", "level 3", and "level 4" dot arrangement patterns are set as denoted by reference signs (a) to (d) in FIG. 28. Then the "level 1" and "level 2" denoted by reference signs (a) and (b) in FIG. 28 are printed during the bi-directional scanning of the print head H (bi-directional printing), whereas the "level 3" and "level 4" denoted by reference signs (c) and (d) in FIG. 28 are printed only during the unidirectional scanning of the print head H (unidirectional printing). Accordingly, for the "level 1" and "level 2" printing areas having low densities, the 8-pass bi-directional printing system causes the print head H to execute eight passes in order to print the same raster using eight different nozzles. As a result, the disturbance of the image caused by the offset (biasing) of the ink ejecting direction of each nozzle can be restrained. On the other hand, for the "level 3" and "level 4" printing areas having high densities, the 8-pass unidirectional printing system carries out printing only during the forward scanning for the odd-number-th ones of the eight passes of the print head H. As a result, the ink overlapping order is fixed, thus avoiding non-uniform colors.

(Other Embodiments)

The print heads used in the present invention are not limited to the ink jet print heads for ejecting the ink but may be arbitrary ones provided with a plurality of printing elements capable of forming dots on the printing medium.

Further, the printing system is not limited to the 8-pass bi-directional printing system as shown in the above described embodiments but may be an arbitrary one that can print dots on N adjacent rasters and dots on M adjacent columns under different conditions by causing the print head to execute scanning of the print head for a plurality of (P) times in the main-scanning direction and transporting the printing medium at least once in the sub-scanning direction. The plurality of dot arrangement patterns used for the same level are not limited to those shown in the above described embodiments but may be such that within each period when the patterns are repeatedly used, the same number of dots are formed in each of the N rasters, whereas the same number of dots are formed in each of the M columns. Moreover, the printing elements in the print head may be arranged in N rows where N is two or more. These N rows of printing elements can form the dots on the N adjacent rasters. In this case, the printing elements are spaced at fixed intervals Py along the row, and the groups of printing elements in the corresponding rows are offset from each other by Py/N.

Further, the dividing number of the distance between the basic lattice points is not limited to two as in the above described embodiments. The dots can be formed, for example, by setting, as a dot interval in main-scanning direction, the distances obtained by M dividing the distance between the basic lattice points and a plural rows of printing elements to perform P main scanning operations where P is a multiple of M. Moreover, when n is defined as an integral between 0 and P/M and k is defined as an integral between 0 and M−1, the dots corresponding to the M divides obtained by dividing the distance between the basic lattice points can be formed during the n×M+k($\leq$P)-th main scanning of the print head.

Further, when n is defined as an integral between 0 and P/M and k is defined as an integral between 1 and M−1, the plurality of dot arrangement patterns periodically used for the same level of image data may be such that the total number of dots formed during the n×M+k($\leq$P)-th main scanning of the print head become the same within each period when the patterns are repeatedly used.

Moreover, the printing range of the dot arrangement patterns is not limited to the one shown in the above described embodiments. The printing range of the dot arrangement patterns may be such that when 1 and m are each defined as a natural number, (1×N) dots are printed in the sub-scanning direction, whereas (m×N×M) dots are printed in the main-scanning direction.

Further, the plurality of dot arrangement patterns periodically used for the same level of image data are desirably such that within each period when the patterns are repeatedly used, when the dots formed on the basis of at least one of the plurality of dot arrangement patterns are shifted at least two pixels in the main-scanning direction, the variation of the coverage is limited to 10% or less.

Moreover, the one dot arrangement pattern used for the same level of image data is not limited to the one shown in the above described embodiment. The one dot arrangement pattern used for the same level of image data may be such a pattern as can maintain the coverage at 90% or more.

(Other)

The present invention achieves distinct effect when applied to a recording head or a recording apparatus which has means for generating thermal energy such as electro-thermal transducers or laser light, and which causes changes in ink by the thermal energy so as to eject ink. This is because such a system can achieve a high density and high resolution recording.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces sudden temperature rise that exceeds the nucleate boiling so as to cause the film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laid-open Nos. 59-123670 (1984) and 59-138461 (1984) in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

The present invention can be also applied to a so-called full-line type recording head whose length equals the maximum length across a recording medium. Such a recording head may consists of a plurality of recording heads combined together, or one integrally arranged recording head.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the effect of the present invention more reliable. Examples of the recovery system are a capping means and a cleaning means for the recording head, and a pressure or suction means for the recording head. Examples of the preliminary auxiliary system are a preliminary heating means utilizing electrothermal transducers or a combination of other heater elements and the electrothermal transducers, and a means for carrying out preliminary ejection of ink independently of the ejection for recording. These systems are effective for reliable recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature. This is because in the ink jet system, the ink is generally temperature adjusted in a range of 30° C.–70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electrothermal transducers as described in Japanese Patent Application Laid-open Nos. 54-56847 (1979) or 60-71260 (1985). The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, and as an output device of a facsimile apparatus having a transmission and receiving function.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A printing apparatus for printing with a print head provided with a plurality of printing elements deployed in a plurality of rows and which can form dots on a printing medium, to print dots on N adjacent rasters and dots on M adjacent columns under different conditions by causing said print head to perform a plurality of (P) main-scanning operations in a main-scanning direction and transporting said printing medium at least once in a sub-scanning direction, said apparatus comprising:

control means for using dot arrangement patterns corresponding to a level of quantized image data to form dots corresponding to the level of said image data on the printed medium, said control means being capable of periodically changing said plurality of dot arrangement patterns used for the same level of said image data, wherein said plurality of dot arrangement patterns used for the same level of said image data are such that within each period when said patterns are periodically used, the number of dots formed in each of said N rasters are equalized, whereas the number of dots formed in each of said M columns are equalized, and said P, N, and M are each an integral number to or larger than 2.

2. A printing apparatus according to claim 1, wherein the dots on the same raster are formed using said different printing elements, by causing said print heads to perform a plurality of (P) main-scanning operations in a main-scanning direction and transporting said printing medium at least once in a sub-scanning direction.

3. A printing apparatus according to claim 1, wherein
said printing elements are arranged at fixed intervals Py along said row, and the groups of said printing elements in said rows are offset from each other by Py/N in a direction of the rows, and
said control means uses the groups of printing elements in said every rows to form dots for said every adjacent rasters.

4. A printing apparatus according to claim 3, wherein
said plurality of printing elements are arranged in N rows, and
said control means uses the groups of printing elements in said every rows to form dots for said every rasters so that the N rows of said printing elements and said N rasters have a one-to-one correspondence.

5. A printing apparatus according to claim 1, wherein
when a dot interval in the main-scanning direction of dots that can be formed during one main scanning operation of said print head using one row of said printing elements is defined as a distance between basic lattice points, said control means sets as the dot interval one of M distances obtained by dividing said distance between the basic lattice points and forms dots by causing said print heads to perform P times of main scanning operations using said plural rows of printing elements, where P is a multiple of M.

6. A printing apparatus according to claim 5, wherein
when n is defined as an integral number between 0 and P/M and k is defined as an integral number between 1 and M−1, said control means form dots at positions corresponding to the M distances obtained by dividing said distance between the basic lattice points, during the n×M+k(≦P)-th main scanning of said print heads.

7. A printing apparatus according to claim 6, wherein
when n is defined as an integral number between 0 and P/M, said plurality of dot arrangement patterns periodically used for the same level of said image data may be such that the total number of dots formed during the n×M+k(≦P)-th main scanning of the print head is equalized for k=1, 2, . . . M−1 within each period when the patterns are repeatedly used.

8. A printing apparatus according to claim 5, wherein
when 1 and m are each defined as a natural number, said dot arrangement patterns have such a printing range that (1×N) dots are printed in the sub-scanning direction, whereas (m×N×M) dots are printed in the main-scanning direction.

9. A printing apparatus according to claim 1, wherein
said plurality of dot arrangement patterns periodically used for the same level of said image data are such that within each period when the patterns are repeatedly used, when the dots formed using at least one of said plurality of dot arrangement patterns are shifted at least two pixels in the main-scanning direction, a variation in the ratio of a printing surface of the printing medium which corresponds to a printing range for said dot arrangement pattern occupied by a surface on which dots are formed using said plurality of dot arrangement patterns is limited to 10% or less.

10. A printing apparatus according to claim 1, wherein
said control means can set one of said dot arrangement pattern which is used for the same level of said image data, and
said one of said dot arrangement pattern which is used for the same level of said image data is such that an area of a surface on which dots are formed in each combination of the 1 to N rasters and the 1 to M columns using said dot arrangement pattern occupies 90% or more of a printing surface of the printing medium which corresponds to a printing range for said dot arrangement pattern.

11. A printing apparatus according to claim 1, wherein
said control means can select, as said dot arrangement pattern corresponding to the level of said image data, either a dot arrangement pattern for unidirectional printing which forms dots only during the main scanning of said print heads in one direction or a dot arrangement pattern for bi-directional printing which forms dots during the main scanning of said print heads in both directions.

12. A printing apparatus according to claim 11, wherein
said control means uses said dot arrangement pattern for unidirectional printing as said dot arrangement pattern corresponding to a predetermined level of said image or less, and uses said dot arrangement pattern for bi-directional printing as said dot arrangement pattern corresponding to a level higher than said predetermined level of said image.

13. A printing apparatus according to claim 1, wherein
said printing elements each have an ejection port through which ink can be ejected.

14. A printing apparatus according to claim 13, wherein
said printing elements each have a electrothermal converter for generating thermal energy used to eject ink from said ejection port.

15. A printing apparatus for printing with a print head provided with a plurality of printing elements deployed in a plurality of rows and which can form dots on a printing medium, to print dots on N adjacent rasters and dots on M adjacent columns under different conditions by causing said print head to perform a plurality of (P) main-scanning operations in a main-scanning direction and transporting said printing medium at least once in a sub-scanning direction, said apparatus comprising:
control means for using dot arrangement patterns corresponding to a level of quantized image data to form dots corresponding to the level of said image data on the printed medium, said control means can set one of said dot arrangement pattern which is used for the same level of said image data,
said one of said dot arrangement pattern which is used for the same level of said image data is such that an area of a surface on which dots are formed in each combination of the 1 to N rasters and the 1 to M columns using said dot arrangement pattern occupies 90% or more of a printing surface of the printing medium which corresponds to a printing range for said dot arrangement pattern, and
said P, N, and M are each an integral number equal to or larger than 2.

16. A printing method for printing with a print head provided with a plurality of printing elements deployed in a plurality of rows and which can form dots on a printing medium, to print dots on N adjacent rasters and dots on M adjacent columns under different conditions by causing said print head to perform a plurality of (P) main-scanning operations in a main-scanning direction and transporting said printing medium at least once in a sub-scanning direction, comprising the steps of:
using dot arrangement patterns corresponding to a level of quantized image data to form dots corresponding to the level of said image data on the printing medium; and
periodically changing said plurality of dot arrangement patterns used for the same level of said image data, wherein
said plurality of dot arrangement patterns used for the same level of said image data are such that within each period when said patterns are periodically used, the number of dots formed in each of said N rasters are equalized, whereas the number of dots formed in each of said M columns are equalized, and said P, N, and M are each an integral number equal to or larger than 2.

17. A printing method for printing with a print head provided with a plurality of printing elements deployed in a plurality of rows and which can form dots on a printing medium, to print dots on N adjacent rasters and dots on M adjacent columns under different conditions by causing said print head to perform a plurality of (P) main-scanning operations in a main-scanning direction and transporting said printing medium at least once in a sub-scanning direction, comprising the steps of:

using dot arrangement patterns corresponding to a level of quantized image data to form dots corresponding to the level of said image data on the printed medium; and setting one of said dot arrangement patterns which is used for the same level of said image data, wherein said one of said dot arrangement pattern which is used for the same level of said image data is such that an area of a surface on which dots are formed in each combination of the 1 to N rasters and the 1 to M columns using said dot arrangement pattern occupies 90% or more of a printing surface of the printing medium which corresponds to a printing range for said dot arrangement pattern, and said P, N, and M are each an integral number equal to or larger than 2.

* * * * *

UNITED STATES PATENT AND TRADEMARK OFFICE
CERTIFICATE OF CORRECTION

PATENT NO.   : 6,557,964 B2                                    Page 1 of 2
DATED        : May 6, 2003
INVENTOR(S)  : Norihiro Kawatoko et al.

It is certified that error appears in the above-identified patent and that said Letters Patent is hereby corrected as shown below:

Title page,
Item [56], References Cited, U.S. PATENT DOCUMENTS,
"6,203,133 B1  3/2001  Hideki et al." should read -- 6,203,133 B1  3/2001 Tanaka et al. --.

Column 3,
Line 1, "above" should read -- above- --; and
Line 7, "above described" should read -- above-described --.

Column 5,
Lines 19 and 24, "above described" should read -- above-described --; and
Line 28, "patters" should read -- patterns --.

Column 6,
Lines 12, 38 and 63, "integral" should read -- integer --.

Column 7,
Line 20, "integral" should read -- integer --.

Column 8,
Lines 14 and 19, "example" should read -- example of an --.

Column 9,
Line 15, "referring," should read -- referring --.

Column 22,
Line 27, "RO" should read -- Ro --; and
Lines 31 and 45, "above described" should read -- above-described --.

Column 23,
Lines 21 and 60, "above described" should read -- above-described --; and
Line 52, "above" should read -- above- --.

Column 24,
Lines 5 and 25, "above" should read -- above- --;
Lines 11, 12, 17 and 18, "integral" should read -- integer --; and
Line 40, "above-described" should read -- above-described --.

UNITED STATES PATENT AND TRADEMARK OFFICE
CERTIFICATE OF CORRECTION

PATENT NO. : 6,557,964 B2
DATED : May 6, 2003
INVENTOR(S) : Norihiro Kawatoko et al.

It is certified that error appears in the above-identified patent and that said Letters Patent is hereby corrected as shown below:

Column 26,
Line 60, "integral" should read -- integer -- and "number to" should read -- number equal to --

Column 27,
Lines 28, 29 and 35, "integral" should read -- integer --.

Column 28,
Line 49, "integral" should read -- integer --.

Column 29,
Line 5, "integral" should read -- integer --.

Column 30,
Line 12, "integral" should read -- integer --.

Signed and Sealed this

Ninth Day of March, 2004

JON W. DUDAS
*Acting Director of the United States Patent and Trademark Office*